(12) United States Patent
Hartl

(10) Patent No.: US 9,614,199 B2
(45) Date of Patent: Apr. 4, 2017

(54) FEEDTHROUGH

(71) Applicant: Schott AG, Mainz (DE)

(72) Inventor: Helmut Hartl, Vienna (AT)

(73) Assignee: Schott AG, Mainz (DE)

( * ) Notice: Subject to any disclaimer, the term of this patent is extended or adjusted under 35 U.S.C. 154(b) by 419 days.

(21) Appl. No.: 14/101,971

(22) Filed: Dec. 10, 2013

(65) Prior Publication Data

US 2014/0099533 A1 Apr. 10, 2014

Related U.S. Application Data

(63) Continuation of application No. PCT/EP2012/002404, filed on Jun. 6, 2012.

(30) Foreign Application Priority Data

Jun. 10, 2011 (DE) .......... 10 2011 103 975
Jun. 10, 2011 (DE) .......... 10 2011 103 976
(Continued)

(51) Int. Cl.
*H01M 2/06* (2006.01)
*H01M 2/08* (2006.01)
(Continued)

(52) U.S. Cl.
CPC .............. *H01M 2/065* (2013.01); *C03C 8/24* (2013.01); *C03C 29/00* (2013.01);
(Continued)

(58) Field of Classification Search
None
See application file for complete search history.

(56) References Cited

U.S. PATENT DOCUMENTS 961,672 A 6/1910 Barnhurst
3,006,984 A 10/1961 Bol et al.
(Continued)

FOREIGN PATENT DOCUMENTS

EP 0 412 655 A2 7/1990
EP 0 885 874 A1 5/1998
(Continued)

OTHER PUBLICATIONS

"Handbook of Batteries", published by David Linden, 2nd issue, McGrawhill, 1995, Chapter 36 & 39 (88 pages).
(Continued)

*Primary Examiner* — Miriam Stagg
*Assistant Examiner* — Wojciech Haske
(74) *Attorney, Agent, or Firm* — Taylor IP, P.C.

(57) ABSTRACT

A feedthrough, for example through a part of a housing, such as a battery housing, is, for example, made of a metal, such as a light alloy, for example aluminum, an aluminum alloy, AlSiC, magnesium, a magnesium alloy, titanium, a titanium alloy, steel, stainless steel or high-grade steel. The housing part has at least one opening through which at least one conductor having a cross-section is guided in a glass or glass ceramic material. The conductor has at least two sections, a first section having a first, substantially round, for example a circular, cross section having a diameter in the region of the feedthrough through the glass or glass ceramic material, and a second section having a second, substantially non-round, for example a substantially rectangular cross-section, and the conductor is formed in one piece.

47 Claims, 10 Drawing Sheets

(30) Foreign Application Priority Data

| Jul. 7, 2011 | (DE) | ................ 10 2011 106 873 |
|---|---|---|
| Feb. 17, 2012 | (WO) | ................ PCT/EP2012/000698 |
| Feb. 17, 2012 | (WO) | ................ PCT/EP2012/000699 |
| Feb. 17, 2012 | (WO) | ................ PCT/EP2012/000700 |
| Feb. 17, 2012 | (WO) | ................ PCT/EP2012/000701 |
| Feb. 17, 2012 | (WO) | ................ PCT/EP2012/000702 |
| Feb. 17, 2012 | (WO) | ................ PCT/EP2012/000703 |

(51) Int. Cl.
*C03C 8/24* (2006.01)
*C03C 29/00* (2006.01)
*H01M 2/02* (2006.01)
*H01M 2/30* (2006.01)
*H01M 10/0525* (2010.01)

(52) U.S. Cl.
CPC ....... *H01M 2/0262* (2013.01); *H01M 2/0285* (2013.01); *H01M 2/08* (2013.01); *H01M 2/305* (2013.01); *H01M 10/0525* (2013.01); *Y02E 60/122* (2013.01); *Y10T 29/4911* (2015.01)

(56) References Cited

U.S. PATENT DOCUMENTS

| 4,202,700 | A | * | 5/1980 | Wilder, Jr. | ................ C03C 3/17 501/10 |
| 4,841,101 | A |   | 6/1989 | Pollock | |
| 5,015,530 | A |   | 5/1991 | Brow et al. | |
| 5,262,364 | A |   | 11/1993 | Brow et al. | |
| 5,373,519 | A |   | 12/1994 | Siono et al. | |
| 5,558,961 | A | * | 9/1996 | Doeff | ................ C01G 45/1221 429/224 |
| 5,773,959 | A |   | 6/1998 | Merritt et al. | |
| 5,849,434 | A |   | 12/1998 | Miura et al. | |
| 5,853,914 | A |   | 12/1998 | Kawakami | |
| 5,874,185 | A |   | 2/1999 | Wang et al. | |
| 5,900,183 | A |   | 5/1999 | Kronfli et al. | |
| 5,952,126 | A |   | 9/1999 | Lee et al. | |
| 6,037,539 | A | * | 3/2000 | Kilgo | ................ C03C 8/24 174/50.61 |
| 6,268,079 | B1 | * | 7/2001 | Inoue | ................ H01M 2/065 429/171 |
| 6,759,163 | B2 |   | 7/2004 | Frysz et al. | |
| 7,687,200 | B2 |   | 3/2010 | Jouanneau-Si-Larbi et al. | |
| 8,507,117 | B2 |   | 8/2013 | Goto et al. | |
| 2003/0134194 | A1 | * | 7/2003 | Lasater | ................ C03C 8/24 429/181 |
| 2004/0138043 | A1 | * | 7/2004 | Kasuga | ................ C03C 3/21 501/45 |
| 2004/0191621 | A1 | * | 9/2004 | Heller, Jr. | ................ H01M 2/065 429/181 |
| 2006/0049421 | A1 |   | 3/2006 | Suehiro et al. | |

FOREIGN PATENT DOCUMENTS

| EP | 0 954 045 A2 | 4/1999 |
| GB | 699492 A | 11/1953 |
| SU | 1 058 909 A | 12/1983 |

OTHER PUBLICATIONS

ISO 540, Hard coal and coke—Determination of ash fusibility, International Standard, Fourth edition, Jun. 1, 2008 (20 pages).
International Search Report dated Sep. 13, 2012 for International Application No. PCT/EP2012/002404 (6 pages).

* cited by examiner

A-A

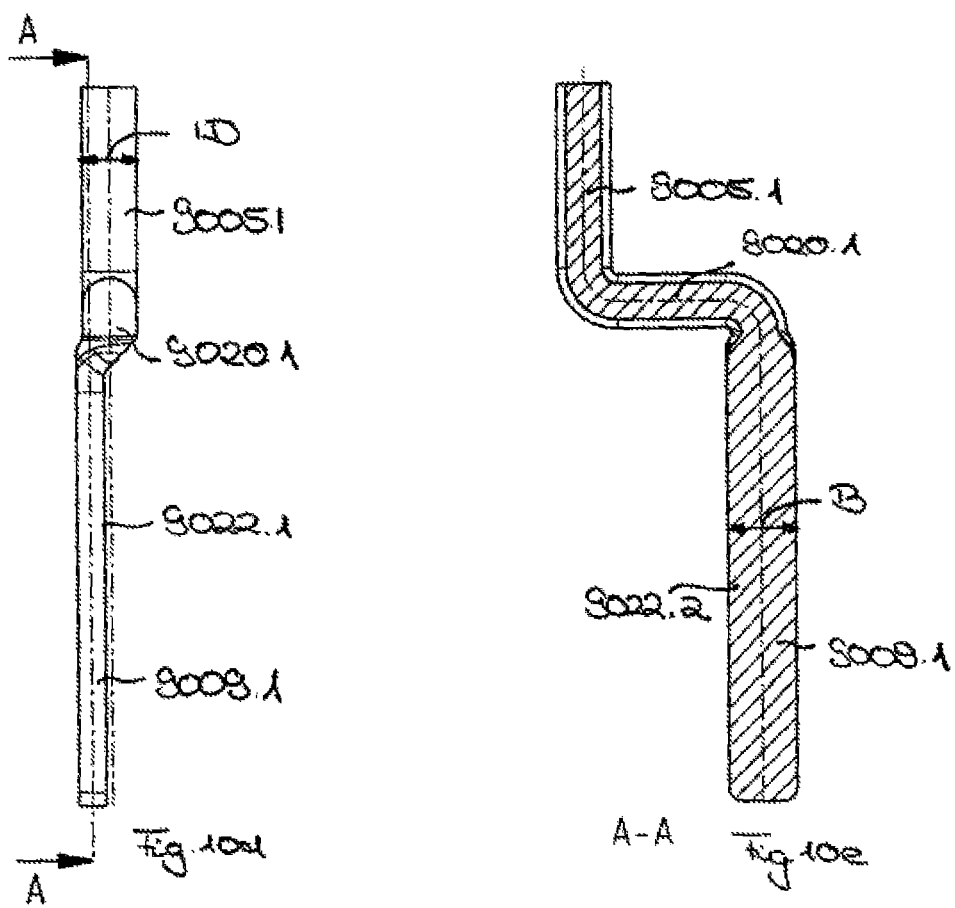

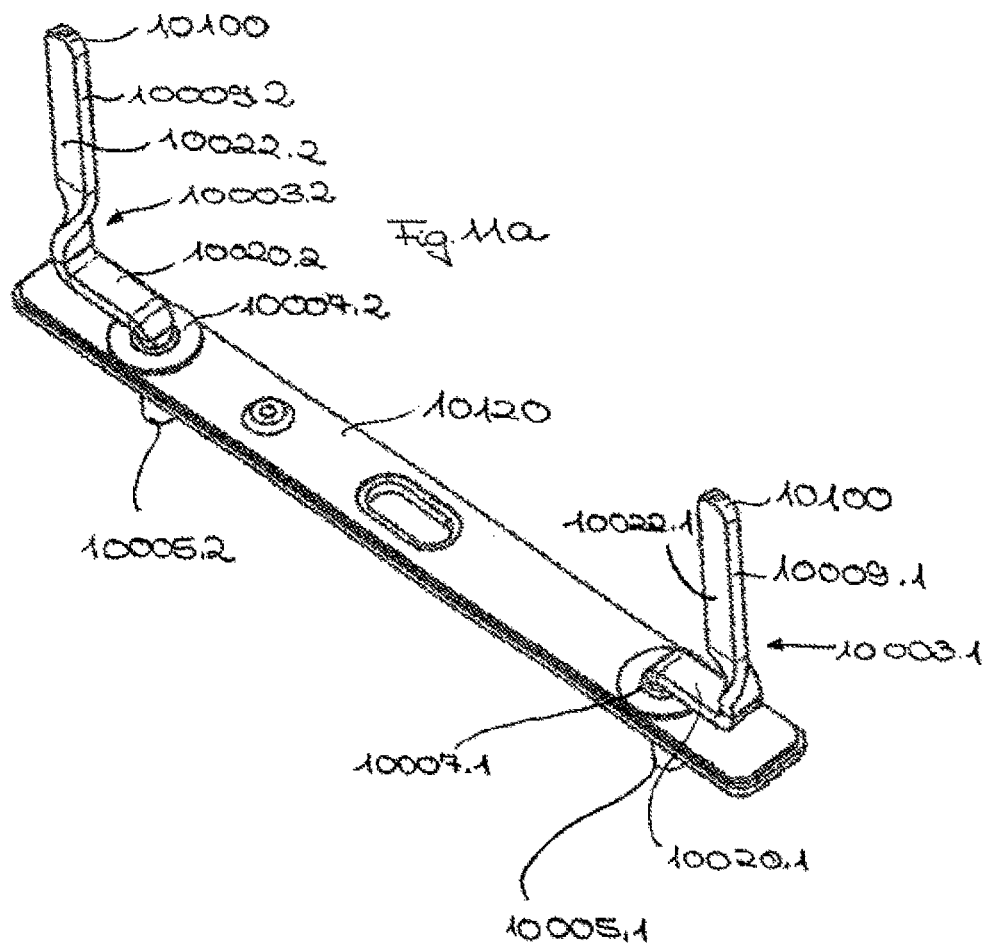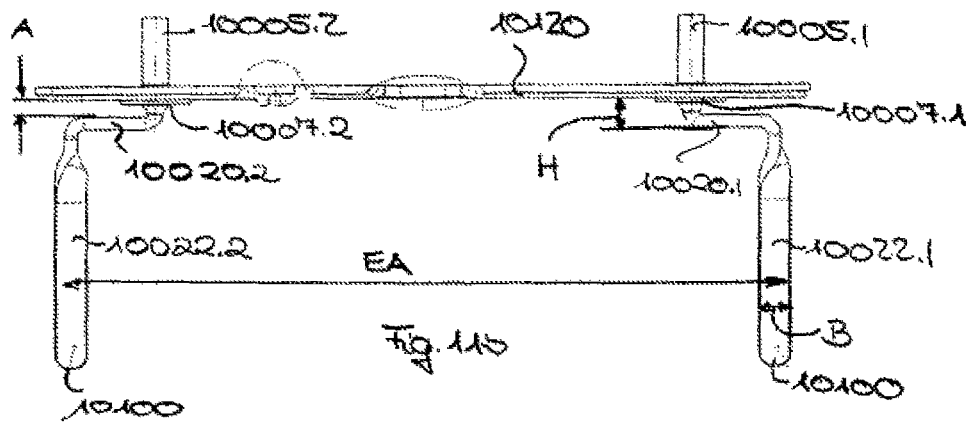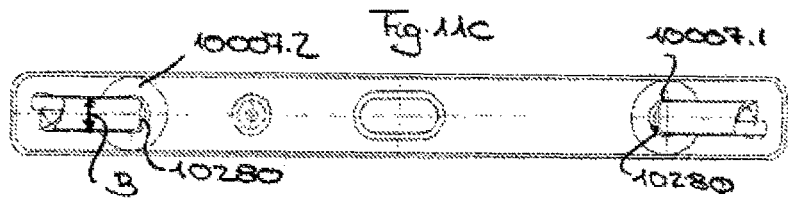

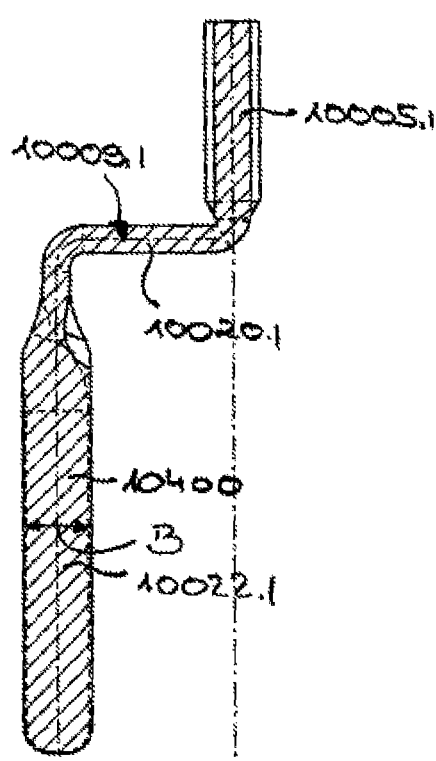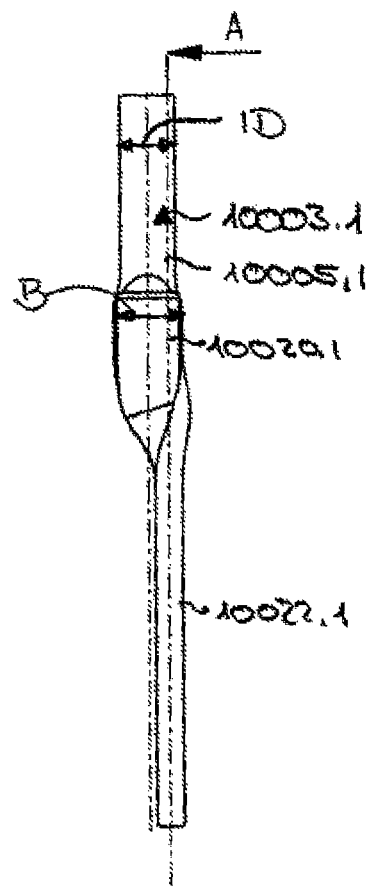

FEEDTHROUGH

CROSS REFERENCE TO RELATED APPLICATIONS

This is a continuation of PCT application No. PCT/EP2012/002404, entitled "FEEDTHROUGH", filed Jun. 6, 2012, which is incorporated herein by reference.

BACKGROUND OF THE INVENTION

1. Field of the Invention

The present invention relates to a feedthrough, in particular to a feed through which passes through a part of a housing, for example a battery cell housing, whereby the housing part has at least one opening through which at least one conductor, embedded in a glass- or glass ceramic material, is guided.

2. Description of the Related Art

Accumulators, preferably lithium-ion batteries are intended for various applications, for example for portable electronic equipment, cell phones, power tools and in particular electric vehicles. The batteries can replace traditional energy sources, for example lead-acid batteries, nickel-cadmium batteries or nickel-metal hydride batteries.

Lithium-ion batteries have been known for many years. In this regard we refer you to the "Handbook of Batteries, published by David Linden, 2nd Issue, McGrawhill, 1995, Chapters 36 and 39".

Various aspects of lithium-ion batteries are described in a multitude of patents, for example, U.S. Pat. No. 961,672; U.S. Pat. No. 5,952,126; U.S. Pat. No. 5,900,183; U.S. Pat. No. 5,874,185; U.S. Pat. No. 5,849,434; U.S. Pat. No. 5,853,914; as well as U.S. Pat. No. 5,773,959.

Lithium-ion batteries, in particular for applications in the automobile industry generally feature a multitude of individual battery cells which are generally connected in-series. The in-series connected battery cells are usually combined into so-called battery packs and then into a battery module which is also referred to as a lithium-ion battery. Each individual battery cell has electrodes which are led out of a housing of the battery cell.

In particular in the use of lithium-ion batteries in the automobile industry, a multitude of problems such as corrosion resistance, stability in accidents or vibration resistance must be solved. An additional problem is the hermetic seal of the battery cells over an extended period of time. The hermetic seal may, for example, be compromised by leakage in the area of the electrodes of the battery cell or respectively the electrode feedthrough of the battery cell. Such leakages may be caused by temperature changes and alternating mechanical stresses, for example vibrations in the vehicle or aging of the synthetic material. A short-circuit or temperature change in the battery or respectively battery cell can lead to a reduced life span of the battery or the battery cell.

In order to ensure better stability in accidents, a housing for a lithium-ion battery is suggested, for example in DE 101 05 877 A1, whereby the housing includes a metal jacket which is open on both sides and which is sealed. The power connection, or respectively the electrodes, are insulated by plastic. A disadvantage of the plastic insulation is the limited temperature resistance, the limited mechanical stability, aging and the uncertain hermetic seal over the service life. The feedthroughs on the lithium-ion batteries according to the current state of the art are therefore not integrated hermetically sealed into the cover part of the Lithium-ion battery. Moreover, the electrodes are crimped and laser welded connecting components with additional insulators in the interior of the battery.

An additional problem with the lithium-ion batteries according to the current state of the art is that the battery cells occupy a large space and because of the high currents due to resistance losses, heat and temperature changes occur quickly.

An alkaline battery has become known from DE 27 33 948 A1 wherein an insulator, for example glass or ceramic, is joined directly by means of a fusion seal with a metal component. One of the metal parts is connected electrically with an anode of the alkaline battery and the other is connected electrically with a cathode of the alkaline battery. The metals used in DE 27 33 948 A1 are iron or steel. Light metals like aluminum are not described in DE 27 33 948 A1. Also, the sealing temperature of the glass or ceramic material is not cited in DE 27 33 948 A1. The alkaline battery described in DE 27 33 948 A1 is a battery with an alkaline electrolyte which, according to DE 27 33 948 A1 contains sodium hydroxide or potassium hydroxide. Lithium-ion batteries are not mentioned in DE 27 33 948 A1.

A method to produce asymmetrical organic carboxylic acid esters and to produce anhydrous organic electrolytes for alkali-ion batteries has become known from DE 698 04 378 T2, or respectively EP 0885 874 B1. Electrolytes for rechargeable lithium-ion cells are also described in DE 698 04 378 T2, or respectively EP 0 885 874 B1.

Materials for the cell pedestal which receives the through-connection are not described; only materials for the connecting pin which may consist of titanium, aluminum, a nickel alloy or stainless steel.

A radio frequency (RF) feedthrough with improved electrical efficiency is described in DE 699 23 805 T2 or respectively EP 0 954 045 B1. The feedthroughs known from EP 0 954 045 B1 are not glass-metal feedthroughs. Glass-metal feedthroughs which are provided immediately inside, for example, the metal wall of a packing are described in EP 0 954 045 B1 as being disadvantageous since RF-feedthroughs of this type, due to embrittlement of the glass, are not durable.

DE 690 230 71 T2, or respectively EP 0 412 655 B1, describes a glass-metal feedthrough for batteries or other electro-chemical cells, whereby glasses having an $SiO_2$ content of approximately 45 weight-% are used and metals, in particular alloys, are being used which contain molybdenum and/or chromium and/or nickel. The use of light metals is also insufficiently addressed in DE 690 230 71 T2, as are sealing temperatures or bonding temperatures for the used glasses. According to DE 690 230 71 T2, or respectively EP 0 412 655 B1, the materials used for the pin-shaped conductor are alloys which contain molybdenum, niobium or tantalum.

A glass-metal feedthrough for lithium-ion batteries has become known from U.S. Pat. No. 7,687,200. According to U.S. Pat. No. 7,687,200 the housing was produced from high-grade steel and the pin-shaped conductor from platinum/iridium. The glass materials cited in U.S. Pat. No. 7,687,200 are glasses TA23 and CABAL-12. According to U.S. Pat. No. 5,015,530 these are $CaO$—$MgO$—$Al_2O_3$—$B_2O_3$ systems having sealing temperatures of 1025° C. or 800° C. Moreover, glass compositions for glass-metal feedthroughs for lithium batteries have become known from U.S. Pat. No. 5,015,530 which contain $CaO$, $Al_2O_3$, $B_2O_3$, $SrO$ and $BaO$ whose sealing temperatures are in the range of 650° C.-750° C. and which are therefore too high for use with light metals.

A feedthrough has become known from U.S. Pat. No. 4,841,101 wherein an essentially pin-shaped conductor is sealed into a metal ring with a glass material. The metal ring is then again inserted into an opening or bore in a housing and is joined material to material through welding, for example through interlocking of a welding ring. The metal ring consists of a metal which has essentially the same or similar thermal coefficient of expansion as the glass material in order to compensate for the high thermal coefficient of expansion of the aluminum of the battery housing. In the design variation described in U.S. Pat. No. 4,841,101 the length of the metal ring is always shorter than the bore or opening in the housing. No references are made in U.S. Pat. No. 4,841,101 to the glass compositions, neither is a special application described for the feedthrough, for example for batteries, in particular Lithium-ion accumulators.

What is needed in the art is a feedthrough which avoids the problems of the current state of the art, in particular resistance losses should be kept to a minimum and after installation of the feedthrough only a small building space should be claimed in the battery cell.

SUMMARY OF THE INVENTION

The present invention provides a feedthrough, whereby a conductor, for example an essentially pin-shaped conductor, embedded in a glass or glass ceramic material, is guided, for example, through an opening in a housing component of a housing, such as a housing for a battery cell, for example consisting of a light metal having a low melting temperature point, such as aluminum, an aluminum alloy, magnesium, a magnesium alloy, titanium, a titanium alloy or of a metal, such as steel, high-grade steel, for example stainless steel or AlSiC.

A battery according to the present invention is to be understood to be a disposable battery which is disposed of and/or recycled after its discharge, as well as an accumulator.

The present invention provides that the conductor includes at least two sections, a first section having a first substantially round, for example circular cross-section, in the region of the feedthrough through the glass or ceramic material and a second section having a second substantially non-round, for example substantially rectangular cross section, and the conductor is formed in one part.

Since the conductor already forms that section on its end facing the battery cell, which serves as cathode or respectively anode for the electrochemical cell, or which can be connected with the anode or cathode, the production cost can be reduced in comparison to embodiments where a separate electrode connection component is added, for example through welding, since no two parts need to be connected.

Due to the substantially rectangular cross section in the second section, the electrochemical cell can be very easily connected to the flat part of the second section. The substantially round cross section in the first section in the region of the seal ensures simple and reliable sealability, thus substantially simplifying the manufacture.

In accordance with one embodiment of the present invention, the second section includes at least two bends and thereby two regions. The electrode distance can hereby easily be adjusted for different battery cells. The second section, for example includes a region which can be connected with an anode and/or cathode of the electrochemical cell, and an additional region. With the additional region, the electrode distance in the battery cell can be easily adapted for the respective battery cell.

In order to save space in the interior of the battery cell, an advancement of the present invention provides that the additional region of the second section extends substantially horizontal and is located perpendicular to the first section and/or to the region which can be connected with the anode and/or cathode of the electrochemical cell.

In order to avoid resistance losses during current conduction and thereby an excessive heat load on the battery cell it is further provided that the first cross section of the first section is substantially the same size as the second cross section of the second section.

In order to avoid bending of the conductor, for example in the region of the second section, it is provided that the second section includes stiffening, for example a U-profile, for example in the additional region of the second section.

In one arrangement of the feedthrough, the conductor is guided through the housing component by an additional base body into which the conductor is sealed. With such an arrangement it is possible to pre-manufacture the feedthrough, in other words to seal the conductor into the base body and subsequently install it into the housing component, for example into a battery cell. The base body can then be optimized for the respective manufacturing technology and shape of the feedthrough and the manufacturing technology and shape of the housing. Substantially smaller heating devices can be used due to pre-manufacturing than when sealing directly into the housing component, since the entire housing component does not need to be heated, for example in an oven, but instead only the base body with it's substantially smaller dimensions. An embodiment of this type where pre-manufacturing of the feedthrough consisting of a base body and a conductor, such as an essentially pin-shaped conductor is possible, moreover makes possible a cost effective integration of the feedthrough into the opening of the housing component, for example in a single step process, for example by utilizing strain-hardening options of the housing component. Effectively this means that that the opening is first worked into the housing component, for example into the cover, for example using stamping. The housing is strain-hardened since it is not heated. In contrast hereto, the base body is soft, since during sealing of the pin-shaped conductor with a glass or glass ceramic material it is heated. In this way it is possible to produce a structurally stable battery cell housing, in particular in the area of the feedthrough, since in contrast to—for example—direct sealing into a housing part, no loss of the strain-hardening in the housing part, in particular the cover, occurs. An additional advantage is that the material strength of the housing component compared to the base body into which the sealing of the pin-shaped conductor occurs can be selected to be clearly less. For example, the material strength of the housing part can be 1.5 millimeters (mm) or less, whereas the base body due to reasons of strength has a thickness of 2.0 mm, for example 3.0 mm or more. The material thickness of the housing or respectively housing part is, for example, between approximately 1 mm and 3 mm, or between approximately 1.5 mm and 3 mm. The thickness of the base body is between 2 mm and 6 mm, for example between 2.5 mm and 5 mm. The thickness of the base body is hereby always adapted to the material thickness of the housing or the housing part, for example the battery cover, into which the feedthrough is placed.

Alternatively to sealing into a base body and subsequent installation of the base body into the opening of the housing component, direct sealing would also be conceivable. This is favored in cases where space losses are to be kept to a minimum. However, the choice of materials for the housing and/or glass material is then limited. When utilizing a base body, the materials for the base body and housing component may advantageously be selected to be different, for example in regard to material quality and the selection of alloys. The feedthrough can be connected with the base body in the housing component hermetically sealed by welding, pressing, crimping, and shrinking. When joining the feedthrough with the housing component, for example by welding, care is taken to keep the temperature input as low as possible in order to avoid damage to the glass or glass ceramic material. In this application "hermetically sealed" for both direct sealing or sealing into a base body means that the helium-leakage is less than $1 \cdot 10^{-8}$ bar liter per second (bar 1/sec). In contrast to the current state of the art wherein a synthetic material seal had to be provided for the feedthrough in a multistep process, a hermetically sealed connection of the inventive feedthrough component with the housing component can be produced in a single simple process step.

Moreover, the selection of the base body can occur also in consideration of the material of the housing part, both as far as the edge configuration as well as the material hardness are concerned and in particular also the method of closure of the housing. If the housing of the battery cell consists, for example, of aluminum then the material for the base body may be selected to be also aluminum.

Moreover it is possible to also introduce other functions in the housing part, in addition to the feedthroughs, for example a safety valve and/or battery filling opening.

In a first embodiment of the present invention, the housing part and/or the base body, for example the essentially ring-shaped base body includes as its material a metal, for example a light metal such as titanium, a titanium alloy, magnesium, a magnesium alloy, an aluminum alloy, aluminum, AlSiC, but also steel, stainless steel or high-grade steel. As the titanium alloy, Ti6246 and/or Ti6242 may, for example, be used. Titanium is a material which is well tolerated by the body, so that it is used for medical applications, for example in prosthetics. Due to its strength, resistance and low weight its use is also favored in special applications, for example in racing sports, but also in aerospace applications.

Additional materials for the base body and/or the housing components are also high-alloyed tool steels which are intended for a later heat treatment. Suitable for use as high-grade steels are, for example, X12CrMoS17, X5CrNi1810, XCrNiS189, X2CrNi1911, X12CrNi177, X5CrNiMo17-12-2, X6CrNiMoTi17-12-2, X6CrNiTi1810 and X15CrNiSi25-20, X10CrNi1808, X2CrNiMo17-12-2, and X6CrNiMoTi17-12-2. In order to be able to provide an especially effective weldability during laser welding as well as during resistance welding, high-grade steels, such as Cr—Ni-steels having material grade numbers (WNr.) according to Euro-Norm (EN) 1.4301, 1.4302, 1.4303, 1.4304, 1.4305, 1.4306, 1.4307 are used as materials for the base body and/or the housing part, for example the battery cell housing. St35, St37 or St38 can be used as standard steel.

Copper (Cu) or a copper alloy may be used for the pin-shaped conductor, if the pin-shaped conductor is to be connected to a cathode of the electrochemical cell or battery, and aluminum (Al) or an aluminum alloy, if the conductor, for example the pin-shaped conductor is to be connected to an anode. Other materials for the pin-shaped conductor can be magnesium, a magnesium alloy, a copper alloy, CuSiC, AlSiC, NiFe, a copper core, that is a NiFe jacket with an interior copper part, silver, a silver alloy, gold, a gold alloy, as well as a cobalt-iron alloy.

As aluminum, or respectively an aluminum alloy, for example for the conductor, the following can be used:
EN AW-1050 A;
EN AW-1350;
EN AW-2014;
EN AW-3003;
EN AW-4032;
EN AW-5019;
EN AW-5056;
EN AW-5083;
EN AW-5556A;
EN AW-6060; and
EN AW-6061.

As copper, for example for the conductor, the following can be used:
Cu-PHC 2.0070;
Cu-OF 2.0070;
Cu-ETP 2.0065;
Cu-HCP 2.0070; and
Cu-DHP 2.0090.

In the current application metals which have a specific weight of less than 5.0 kilograms per cubic decimeter ($kg/dm^3$) are understood to be light metals. The specific weight of the light metals is, for example in the range of between approximately 1.0 $kg/dm^3$ and 3.0 $kg/dm^3$.

If the light metals are additionally used as materials for the conductors, for example for the pin-shaped conductor or the electrode connecting component, then the light metals further distinguish themselves through a specific electric conductivity in the range of $5 \cdot 10^6$ Siemens per meter (S/m) to $50 \cdot 10^6$ S/m. When used in compression seal feedthroughs, the coefficient of expansion $\alpha$ of the light metal for the range of 20° C. to 300° C. is moreover in the range of $18 \cdot 10^{-6}$/Kelvin (K) to $30 \cdot 10^{-6}$/K. Light metals generally have melting temperatures in the range of 350° C. to 800° C.

The base body is, for example in the embodiment of a ring-shaped base body, such as in a circular shape, but also oval. The oval shape is feasible, for example, when the housing part, such as the cover part of the battery cell into whose opening(s) the feedthrough is integrated, has a narrow longitudinal shape and the glass or respectively glass ceramic material with which the pin-shaped conductor is guided through the housing part into the opening is integrated fully between the base body and the pin-shaped conductor. With a configuration of this type the feedthrough consisting essentially of the pin-shaped conductor and an essentially ring-shaped base body, can be pre-manufactured.

For this embodiment, glass or glass ceramic materials are such materials, for example which have a sealing temperature which is lower than the melting temperature of the base body and/or the essentially pin-shaped conductor. Exemplary glass or glass ceramic compositions have low sealing temperatures, for example compositions including the following components:

| | |
|---|---|
| $P_2O_5$ | 35-50 mol-%, for example 39-48 mol-%; |
| $Al_2O_3$ | 0-14 mol-%, for example 2-12 mol-%; |
| $B_2O_3$ | 2-10 mol-%, for example 4-8 mol-%; |
| $Na_2O$ | 0-30 mol-%, for example 0-20 mol-%; |
| $M_2O$ | 0-20 mol-%, for example 12-20 mol-%, whereby M = K, Cs or Rb; |
| PbO | 0-10 mol-%, for example 0-9 mol-%; |
| $Li_2O$ | 0-45 mol-%, for example 0-40 mol-%, or 17-40 mol-%; |
| BaO | 0-20 mol-%, for example 0-20 mol-%, or 5-20 mol-%; and |
| $Bi_2O_3$ | 0-10 mol-%, for example 1-5 mol-%, or 2-5 mol-%. |

Further exemplary compositions include the following components in mol-%:

| | |
|---|---|
| $P_2O_5$ | 38-50 mol-%, for example 39-48 mol-%; |
| $Al_2O_3$ | 3-14 mol-%, for example 2-12 mol-%; |
| $B_2O_3$ | 4-10 mol-%, for example 4-8 mol-%; |
| $Na_2O$ | 10-30 mol-%, for example 0-20 mol-%; |
| $K_2O$ | 10-20 mol-%, for example 12-19 mol-%; and |
| PbO | 0-10 mol-%, for example 0-9 mol-%. |

The previously listed glass compositions distinguish themselves not only through a low sealing temperature and a low Tg, but also in that they have sufficient resistance to battery-electrolytes, and in this respect ensure the required long-term durability.

The glass materials specified above are stable phosphate glasses which, as known, alkali-phosphate glasses have clearly low overall alkali content.

Because of the generally high crystallization-stability of the phosphate glasses it is ensured that the sealing of the glasses is generally not hampered even at temperatures of <600° C. This allows for most of the listed glass compositions to be used as solder glass since sealing of the glass compositions is generally not hampered even at temperatures of <600° C.

The previously mentioned glass compositions contain Lithium, which is integrated in the glass structure. The glass compositions are hereby especially suited for Lithium-ion storage devices which include electrolytes based on Lithium, for example a 1 M $LiPF_6$-solution, including a 1:1 mixture of ethylene-carbonate and dimethyl-carbonate.

Low sodium, or respectively sodium-free, glass compositions are feasible since the diffusion of the alkali-ions occurs in Na+>K+>Cs+ sequence, and since therefore low sodium glasses or respectively sodium-free glasses are especially resistant to electrolytes, especially those which are used in Lithium-ion storage devices.

Moreover, these types of glass compositions have a thermal expansion α in a temperature range of 20° C. to 300° C.>$14 \cdot 10^{-6}$/K, for example between $15 \cdot 10^{-6}$/K and $25 \cdot 10^{-6}$/K. An additional advantage of the glass composition is that sealing of the glass with the surrounding light metal or respectively the metal of the conductor, for example in the embodiment of a metal pin, is possible also in a gaseous atmosphere which is not an inert gas atmosphere. In contrast to the previously used method, a vacuum is also no longer necessary for Aluminum-sealing.

This type of sealing can rather occur under atmospheric conditions. For both types of sealing $N_2$ or Ar can be used as inert gas. As a pre-treatment for sealing, the metal is cleaned and/or etched, and if necessary is subjected to targeted oxidizing or coating. During the process temperatures of between 300° C. and 600° C. are used at heating rates of 0.1 to 30 degrees Kelvin per minute (K/min) and dwell times of 1 to 60 minutes.

The sealing temperature may for example be determined through the hemispherical temperature, as described in R. Görke, K. J. Leers: Keram. Z. 48 (1996) 300-305, or according to DIN 51730, ISO 540 or CEN/TS 15404 and 15370-1, whose disclosure content is incorporated in its entirety into the current patent application. The measurement of the hemispherical temperature is described in detail in DE 10 2009 011 182 A1, whose disclosure content is incorporated in its entirety into the current patent application. According to DE 10 2009 011 182A1, the hemispherical temperature can be determined in a microscopic process by using a heating stage microscope. It identifies the temperature at which an originally cylindrical test body melts into a hemispherical mass. A viscosity of approximately log η=4.6 deciPascals (dPas) can be allocated to the hemispherical temperature, as can be learned from appropriate technical literature. If a crystallization-free glass, for example in the form of a glass powder, is melted and then cooled so that it solidifies, it can then normally be melted down again at the same melting temperature. For a bonded connection with a crystallization-free glass this means that the operating temperature to which the bonded connection is continuously subjected may not be higher than the sealing temperature. Glass compositions as utilized in the current application are generally often produced from a glass powder which is melted down and which, under the influence of heat, provides the bonded connection with the components which are to be joined. Generally, the sealing temperature or melting temperature is consistent with the level of the so-called hemispherical temperature of the glass. Glasses having low sealing temperatures, or respectively melting temperatures, are also referred to as solder glass. Instead of sealing or melting temperature, one speaks of solder temperature or soldering temperature in this instance. The sealing temperature or respectively the solder temperature may deviate from the hemispherical temperature by +20K. The housing part of the battery housing, or respectively the battery cell housing, may have an outside and an inside, and the base body of the feedthrough is connected with the inside or the outside of the housing part, for example by flanging, welding, pressing, soldering or shrinking.

The base body may further have a protrusion, so that a part of the base body engages in the opening of the housing component, and that another part of the base body protrudes over the opening and rests on the inside or the outside of the housing part, or respectively can be connected there with the housing part.

In addition to the feedthrough, the present invention also provides a housing, for example for an electrical storage device, such as a battery cell. The housing includes at least one housing part having at least one opening. The opening of the housing part accommodates an inventive feedthrough with at least one pin-shaped conductor which is sealed into a base body.

The battery cell which is provided for the housing is, for example, a battery cell for a lithium-ion battery.

The present invention moreover provides a method to produce a feedthrough with at least one essentially pin-shaped conductor, whereby the method includes the following steps:

a conductor which can be, but does not have to be, substantially pin-shaped, with for example a round, such as a circular cross section is re-shaped such, that the conductor includes two sections, a first section having a substantially round, for example a circular cross section and a second section having a substantially non-round, for example a rectangular cross section;

the conductor, for example the substantially pin-shaped conductor is sealed in the first section into a glass or glass ceramic material resulting in the feedthrough for a housing component of a housing, for example a battery cell housing.

Further, the conductor prior to insertion into the opening of the housing component may be sealed into a base body and the base body with the conductor, embedded in glass is introduced into an opening of the housing component.

Direct sealing in glass is also possible, meaning that the sealing in glass occurs directly into the cover part of the housing, which is advantageous in particular in regard to spatial aspects.

In order to be able to adjust the electrode distances it is provided that the conductor is reshaped in such a way that the second section of the conductor has two bends. An especially simple adaptation of the electrode distances to different battery cells is achieved if the second section of the conductor is reshaped in such a way that it includes a region which can serve as anode and/or cathode of the electrochemical cell, or can be connected with anode and/or cathode, and an additional region which extends substantially horizontally and is located perpendicular to the first section and/or to the region which can be connected with the anode and/or cathode.

In addition, a method is shown for the insertion of a feedthrough with a base body into a housing component, which distinguishes itself in that in the case of a feedthrough with a base body and therein sealed conductor, for example a pin-shaped conductor, the base body is connected with the housing component using welding, for example laser welding, electron beam welding, ultrasonic welding, resistance welding as well as alternatively using soldering, shrinking, pressing or flanging.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 10d-10e are a detailed illustration of a conductor of the feedthrough according to FIGS. 10a-10c;

FIGS. 11a-11c illustrate a cover part for a battery cell housing for a battery cell with a feedthrough according to the present invention in one-part configuration in a fifth arrangement, whereby the conductor is sealed in glass directly into the opening of the cover part; and FIGS. 11d-11e are detailed illustrations of a conductor of the feedthrough according to FIGS. 11a-11c.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
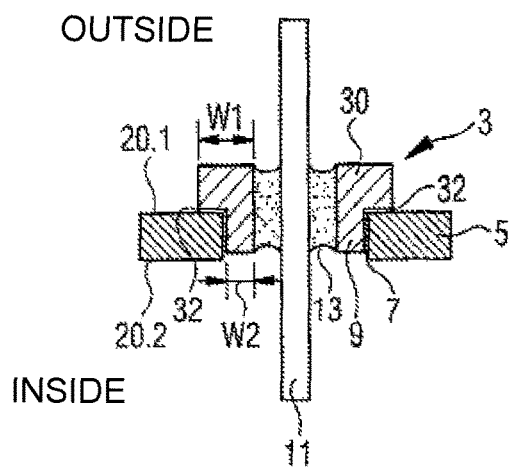
FIGS. 1a-1b are an example of a first embodiment of a feedthrough of the present invention with a metal pin and a base body in a housing component, whereby the base body is in the embodiment of a flange ring.

Referring now to the drawings, and more particularly to FIGS. 1a to 6b, there are illustrated examples of feedthroughs according to the present invention, wherein the feedthroughs include base bodies into which a conductor, for example a pin-shaped conductor is sealed. The feedthroughs with a base body are exemplary for the present invention, however not mandatory. Direct sealing would also be conceivable, as shown in the examples in FIGS. 10a to 11e. In FIGS. 1a to 6b only the conductors are shown in the region of the seal. Regarding the inventive conductors with two sections in a single component arrangement, we refer to FIGS. 9a to 11e.

FIG. 1 illustrates a feedthrough 3 through a housing component 5 of a housing, for example a housing for an accumulator, such as for a battery cell for a lithium-ion battery, according to, for example, FIGS. 7a-11c.

Housing component 5 has an opening 7 which is placed into the housing component. The inventive feedthrough, including the base body, for example essentially ring-shaped base body 9, which accommodates one section of a conductor, for example essentially pin-shaped conductor 11, is inserted into opening 7. In the illustrated arrangement a section, for example the first section of the conductor, having a substantially round, for example a circular, cross section is sealed into substantially ring-shaped base body 9. In order to provide a hermetic feedthrough of the conductor, for example the substantially pin-shaped conductor 11, through the base body and thereby opening 7, the section of substantially pin-shaped conductor 11 is sealed into a glass plug consisting essentially of a glass- or glass ceramic material, in other words, base body 9 and substantially pin-shaped conductor 11 are fused with glass 13. If materials with different coefficients of expansion $\alpha$ are used, for example for base body 9, pin-shaped conductor 11 and glass material 13, then a so-called compression seal feedthrough can be provided. The advantage of a compression seal feedthrough consists in that, that even under a greater load upon the glass plug, for example in the event of compressive stress, expulsion of the glass plug with the metal pin from the base body is avoided. The sealing temperature of the glass- or glass ceramic material is, for example, 20K to 100K below the melting temperature of the material of base body 9 and/or of pin-shaped conductor 11. If base body 9 is constructed of a metal having a low melting point, for example a light metal, such as aluminum, an aluminum alloy, magnesium, a magnesium alloy or AlSiC, titanium, a titanium alloy, but also steel, stainless steel or high-grade steel, then a glass material through which the conductor is guided and which includes the following components in mol.-% may be used:

| | |
|---|---|
| $P_2O_5$ | 35-50 mol-%, for example 39-48 mol-%; |
| $Al_2O_3$ | 0-14 mol-%, for example 2-12 mol-%; |
| $B_2O_3$ | 2-10 mol-%, for example 4-8 mol-%; |
| $Na_2O$ | 0-30 mol-%, for example 0-20 mol-%; |
| $M_2O$ | 0-20 mol-%, for example 12-20 mol-%, whereby M = K, Cs or Rb; |
| PbO | 0-10 mol-%, for example 0-9 mol-%, such as 0 mol-%; |
| $Li_2O$ | 0-45 mol-%, for example 0-40 mol-%, or 17-40 mol-%; |
| BaO | 0-20 mol-%, for example 0-20 mol-%, or 5-20 mol-%; and |
| $Bi_2O_3$ | 0-10 mol-%, for example 1-5 mol-%, or 2-5 mol-%. | sufficiently crystallization-stable, whereby melting of the glasses at temperatures of generally <600° C. is not impeded.

An exemplary glass composition includes 4-8 mol-% $Bi_2O_3$. $Bi_2O_3$ can replace the environmentally damaging PbO. Moreover, the water resistance can be clearly increased through the addition of $Bi_2O_3$. In particular, even with a small addition of 1 mol-% $Bi_2O_3$, an alkali-phosphate glass composition with an essentially same alkali content can be made already surprisingly 10-times more water resistant than an alkali-phosphate glass composition in which no $Bi_2O_3$ with the exception of contamination, is present. This effect was surprising for an expert.

Because of environmental reasons, glasses which, with the exception of contaminations, do not contain Pb, that is—PbO is 0 mol-% are advantageous. In this application, to be free of Pb with the exception of contamination means— as mentioned previously that the glass contains an amount of <100 parts per million (ppm), for example <10 ppm, or <1 ppm lead.

Below, eight exemplary compositions are shown in Table 1 for the aforementioned glass compositions.

TABLE 1

| | Examples: | | | | | | | |
|---|---|---|---|---|---|---|---|---|
| | AB1 | AB2 | AB3 | AB4 | AB5 | AB6 | AB7 | AB8 |
| Mol-% | | | | | | | | |
| $P_2O_5$ | 47.6 | 43.3 | 43.3 | 43.3 | 37.1 | 40.0 | 42.0 | 46.5 |
| $B_2O_3$ | 7.6 | 4.8 | 4.7 | 4.8 | 4.9 | 6.0 | 6.0 | 7.6 |
| $Al_2O_3$ | 4.2 | 8.6 | 8.7 | 2.0 | 2 | 12.0 | 12.0 | 4.2 |
| $Na_2O$ | 28.3 | 17.3 | | | | 15.0 | 16.0 | 28.3 |
| $K_2O$ | 12.4 | 17.3 | 17.3 | | | 18.0 | 19.0 | 12.4 |
| PbO | | | | | | 9.0 | | |
| BaO | | 8.7 | 8.7 | 15.4 | 14 | | | |
| $Li_2O$ | | | 17.3 | 34.6 | 42.1 | | | |
| $Bi_2O_3$ | | | | | | | 5 | 1 |
| Hemispherical Temperature (° C.) | 513 | 554 | 564 | 540 | 625 | | 553 | 502 |
| α (20-300° C.) ($10^{-6}$/K) | 19 | 16.5 | 14.9 | 13.7 | 14.8 | 16.7 | 16.0 | 19.8 |
| Tg (° C.) | 325 | 375 | 354 | 369 | 359 | 392 | 425 | 347 |
| Density [g/cm³] | 2.56 | | | | | 3 | 3.02 | 2.63 |
| Leaching in Mass-% | 18.7 | 14.11 | 7.66 | 12.63 | 1.47 | 3.7 | 29.01 | 8.43 |
| Weight loss (%) after 70 hours in 70° C.-water | 10.7 | 0.37 | 0.1 | 0.13 | 0.13 | n.B. | 0.006/0.001 | 0.45/0.66 |

In a further embodiment the glass composition includes the following components in mol.-%:

| | |
|---|---|
| $P_2O_5$ | 38-50 mol-%, for example 39-48 mol-%; |
| $Al_2O_3$ | 3-14 mol-%, for example 4-12 mol-%; |
| $B_2O_3$ | 4-10 mol-%, for example 4-8 mol-%; |
| $Na_2O$ | 10-30 mol-%, for example 14-20 mol-%; |
| $K_2O$ | 10-20 mol-%, for example 12-19 mol-%; and |
| PbO | 0-10 mol-%, for example 0-9 mol-%, or 0 mol-%. |

In one variation of the present invention, the glass composition includes at least 17 mol-% $Li_2O$ and at most 35 mol-% $Li_2O$. Such glass compositions are sufficiently resistant to electrolytes which contain Lithium, as well as being The aforementioned special glass composition distinguishes itself in that the glass materials have very high thermal expansions in the range of >15×$10^{-6}$/K, for example in the range of 15×$10^{-6}$/K to 25×$10^{-6}$/K for temperatures between 20° C. and 300° C., and therefore in the range of the thermal expansion of light metals such as aluminum, but also of similar metals for essentially pin-shaped conductor 11, which are guided through the glass material, namely copper. At room temperature, aluminum has a thermal expansion of α=23×$10^{-6}$/K, copper of 16.5×$10^{-6}$/K. In order to avoid that during the sealing process the light metal of the base body, and possibly also the metal pin melts or deforms, the melting temperature of the glass material is below the melting temperature of the material of the base body and/or the conductor. The sealing temperature of the listed glass composition is then in the range of 250° C. to 650° C. Sealing of essentially pin-shaped conductor 11 into base body 9 prior to placing the feedthrough into opening 7 is achieved in that the glass together with the conductor, for example the pin-shaped conductor is heated to the sealing temperature of the glass, so that the glass material softens and surrounds the conductor, in particular the pin-shaped conductor in the opening and fits against base body 9. If, for example as described above, aluminum is used for base body 9 as light metal having a melting point $T_{melt}$=660.32° C., then the sealing temperature of the glass material is, as described above, for example in the range of 350° C. to 640° C. The material of pin-shaped conductor 11 may be identical to the material of the base body which has the advantage that the coefficient of expansion for the base body and for the metal pin is identical. The pin-shaped conductor may include aluminum, an aluminum alloy, AlSiC, copper, a copper alloy, CuSiC- or NiFe-alloys, a copper core, that is a NiFe jacket with an interior copper part, silver, a silver alloy, gold or a gold alloy. If the coefficient of expansion $\alpha$ in the range of 20° C. to 300° C. of the glass or glass ceramic material is not completely adapted to the material of the base body then a compression seal feedthrough is provided. Otherwise it is a so-called adapted feedthrough.

Glass compositions AB1, AB2, AB3, AB4, AB5, AB7 and AB8 of the above-identified examples are lead free with the exception of contamination, thereby reducing potential environmental impact.

Potential materials for the base body are light metals, such as aluminum (Al), AlSiC, an aluminum alloy, magnesium, a magnesium alloy, titanium, a titanium alloy. Alternative materials for the base body are metals such as steel, stainless steel, high-grade steel or tool steel.

The sealing temperature of the glass or glass ceramic is to be understood to be the temperature of the glass or the glass ceramic whereby the glass material softens and then fits closely against the metal with which is to be sealed so that a bonded joint connection is obtained between the glass or the glass ceramic and the metal.

The sealing temperature may, for example, be determined through the hemispherical temperature, as described in R. Görke, K. J. Leers: Keram. Z. 48 (1996) 300-305, or according to DIN 51730, ISO 540 or CEN/TS 15404 and 15370-1, whose disclosure content is incorporated in its entirety into the current patent application. The measurement of the hemispherical temperature is described in detail in DE 10 2009 011 182 A1, whose disclosure content is incorporated in its entirety into the current patent application. The solder glasses having become known from DE 10 2009 011 182 A1 pertain to high temperature applications, for example fuel cells.

The previously cited phosphate glass compositions have a Lithium-share of up to 45 mol-%, for example 35 mol-%. Surprisingly, these glass compositions are crystallization-stable, meaning they do not display detrimental crystallization during a downstream sintering process, in particular any substantial crystallization for less than 35 mol-%.

The previously mentioned glass compositions contain Lithium which is integrated in the glass structure. The glass compositions are hereby especially suited for Lithium-ion storage devices which includes electrolytes based on Lithium, for example a 1 M $LiPF_6$-solution, including a 1:1 mixture of ethylene-carbonate and dimethyl-carbonate.

Low sodium, or respectively sodium-free, glass compositions are feasible since the diffusion of the alkali-ions occurs in Na+>K+>Cs+ sequence and since therefore low sodium or respectively sodium-free glasses are especially resistant to electrolytes, especially those which are used in Lithium-ion storage devices.

The previously cited glass compositions have a thermal expansion $\alpha$ (20° C. to 300° C.)>14·10$^{-6}$/K, for example between 15·10$^{-6}$/K and 25·10$^{-6}$/K. An additional advantage of the glass composition is that sealing of the glass with the surrounding light metal or respectively the metal of the conductor, for example in the embodiment of a metal pin, is possible also in a gaseous atmosphere which is not an inert gas atmosphere. In contrast to the previously used method, a vacuum is also no longer necessary for Aluminum-sealing. This type of sealing can rather occur under atmospheric conditions. For both types of sealing $N_2$ or Ar can be used as inert gas. As a pre-treatment for sealing, the metal is cleaned and/or etched, and if necessary is subjected to targeted oxidizing or coating. During the process temperatures of between 300 and 600° C. are used at heating rates of 0.1 to 30 degrees Kelvin per minute (K/min.) and dwell times of 1 to 60 minutes.

Figure 1B:
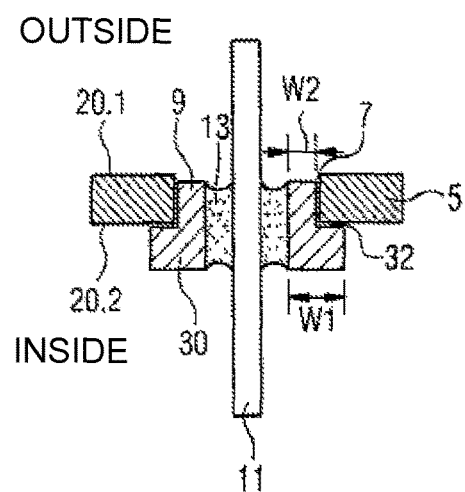

Furthermore, a housing part 5 of the housing of the battery or battery cell, in this case the battery cover is illustrated in FIGS. 1a and 1b and is equipped with the openings for the feedthrough of the electrodes. The battery cover or respectively the housing component may also be produced from aluminum. Materials also conceivable for the battery cover or the housing part are, however, also: aluminum alloys, magnesium as well as magnesium alloys, AlSiC, titanium, titanium alloys, but also steel, stainless steel or high-grade steel. The housing part has an outside 20.1 and an inside 20.2. The outside extends outward from the battery cell; the inside extends—for example in the case of a lithium-ion accumulator—toward the electrolyte of the battery cell. The entire housing with battery cell and feedthroughs is illustrated in FIGS. 7a-11c.

In the case of lithium-ion batteries, typically a non-aqueous electrolyte, typically consisting of a carbonate, for example a carbonate mixture, such as a mixture of ethylene-carbonate and dimethyl-carbonate is used, whereby the aggressive non-aqueous battery electrodes include a conducting salt, for example conducting salt $LiPF_6$ in the form of a 1-Molar solution.

According to the first example, base body 3 features a protrusion 30, whereby wall thickness $W_1$ of the ring-shaped body in the example according to FIG. 1a is greater on the outside of the housing part than thickness $W_1$ of ring-shaped base body 9 in the region of the inside of the housing part, resulting in a contact 32 of the base body on the outside of the ring-shaped body. Ring body 9 can be connected with housing part 5 in the area of contact 32 by means of laser welding, electron beam welding, soldering, or shrinking into opening 7, as well as pressing into opening 7 and flanging.

FIG. 1b is an analog example to FIG. 1a of a feedthrough, wherein identical reference numbers have been used for identical components. However, in this case width $W_1$ in the region of inside 20.2 is greater than width $W_2$ in the region of outside 20.1.

Other than that, the arrangement according to FIG. 1b is identical to FIG. 1a. As in FIG. 1a the connection between housing part 5, in this case the battery cover, and base body 30 can occur, for example as previously described through laser welding, electron beam welding, soldering, shrinking or pressing into opening 7.

Figure 2A:
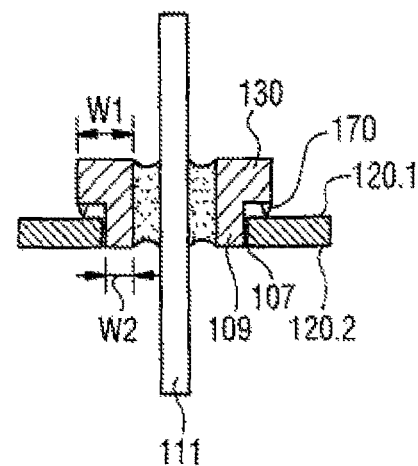
FIGS. 2a-2b are an example of a second embodiment of a feedthrough according to the present invention with a base body which is in the embodiment of a welding ring.
Figure 2B:
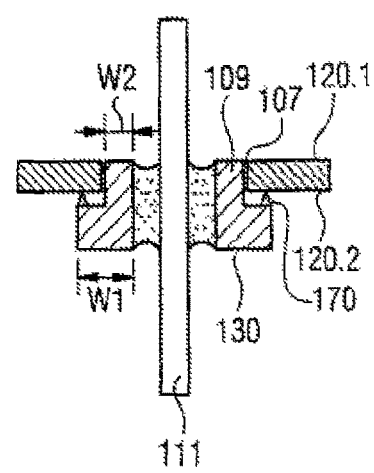

Whereas the base body according to FIGS. 1a and 1b is essentially a flange ring, ring-shaped base body 109, according to the arrangement shown in FIGS. 2a and 2b there is a ring-shaped base body with a welding ring 170. Identical components as in FIGS. 1a and 1b are identified with reference numbers increased by 100. The arrangement according to FIGS. 2a to 2b is substantially identical to the arrangements according to FIGS. 1a to 1b. Ring-shaped base body 109 with welding ring 170 permits joining of base body 109 with the housing part by alternative connection methods. Connecting the ring-shaped base body with the housing part in the region of welding ring 170 can occur through resistance welding or resistance soldering.

Figure 3:
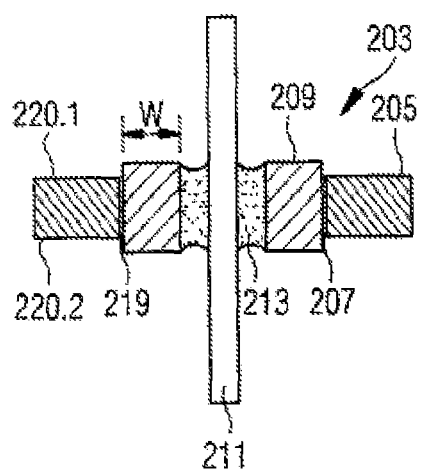
FIG. 3 is an example of a third embodiment of a feedthrough according to the present invention, whereby the base body is connected with the housing component in the area of the opening using laser welding, soldering, shrinking or electro-welding.

FIG. 3 illustrates an additional arrangement of a feedthrough with a base body. Identical components as in FIGS. 1a to 1b and 2a to 2b are identified with reference numbers increased by 200 compared to FIGS. 1a and 1b or respectively 100 compared to FIGS. 2a to 2b.

In contrast to the arrangements according to FIGS. 1a to 1b and 2a to 2b, the base body has no different widths W1 and W2, so that a contact 32 is created. Width W of the ring-shaped base body is uniform over the entire height. Ring-shaped base body 209 having the same width over the entire height is placed into opening 207. A connection between housing part 205 and feedthrough 203, including ring-shaped base body 209 as well as glass material 213 and the section of the substantially pin-shaped conductor 211 is achieved by insertion into opening 207 and subsequent joining in the region of side walls 219 of opening 207. The connection can be accomplished through laser welding, soldering, shrinking, pressing into the opening or electron beam welding.

Figure 4A:
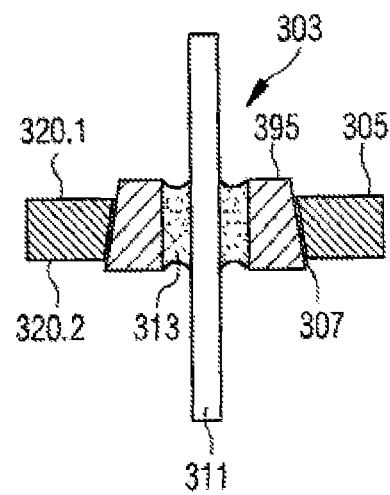
FIGS. 4a-4c are an example of a fourth embodiment of a feedthrough according to the present invention with a conical ring as the base body which is to be placed into an opening in the housing component.
Figure 4B:
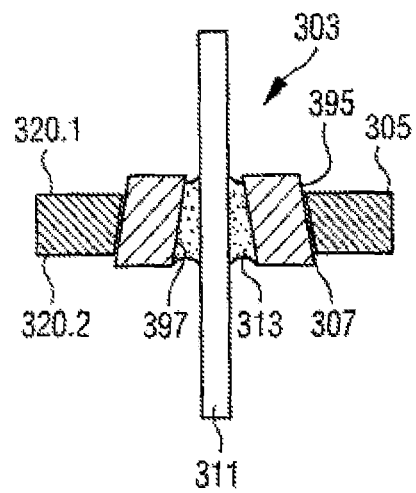
Figure 4C:
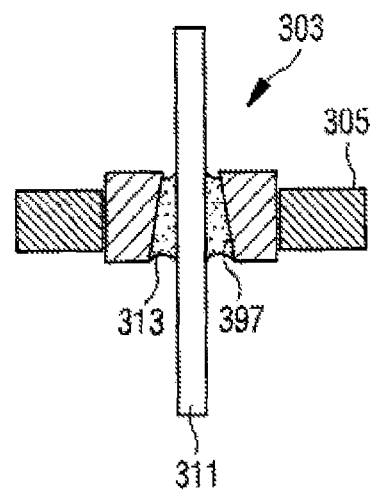

FIGS. 4a-4c illustrate alternative arrangements of a feedthrough which is placed into opening 307 in housing part 305. This is essentially consistent with the arrangement according to FIG. 3, whereby identical components are identified by reference numbers increased by 100. In contrast to FIG. 3, base body 309 is however in the form of a conical ring which is inserted into a conically progressing opening 307. The connection between the feedthrough occurs again between the side walls of conical opening 307 and conical base body 309, for example through welding, soldering, flanging, or shrinking. It is however also possible to press the essentially conically progressing annular base body 309 into conical opening 307 in housing part 305. The conical base body can be in the form of the three arrangements illustrated in FIGS. 4a-4c. In FIG. 4a the base body is conical on outside 395 toward housing part 305; in FIG. 4b on outside 395, as well as on inside 397 facing pin-shaped conductor 311, and in FIG. 4c only on inside 397. Due to the conical form of the opening, as well as of the base body, a relative movement of the feedthrough in the direction of outside 320.1 of housing part 305 is avoided, since the conical bore and the conically shaped base body act as a barb and a relative movement in the direction of outside 320.1 leads to a positive locking fit between base body 309 of feedthrough 303 and the sidewalls of opening 307.

One advantage of the arrangement according to FIGS. 4a-c is that even under increased load on the feedthrough, for example pressure load, pushing feedthrough 303 with metal pin 311 out of feedthrough opening 307 is securely avoided. It is further feasible if openings 307 are introduced into housing part 305 through a simple manufacturing method, for example punching.

Figure 5A:
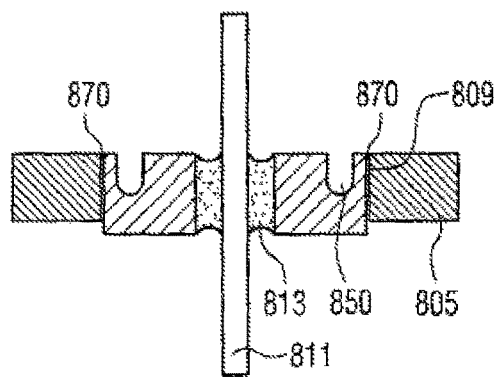
FIGS. 5a-5b are an example of a feedthrough according to the present invention with a thermal barrier and mechanical relief.
Figure 5B:
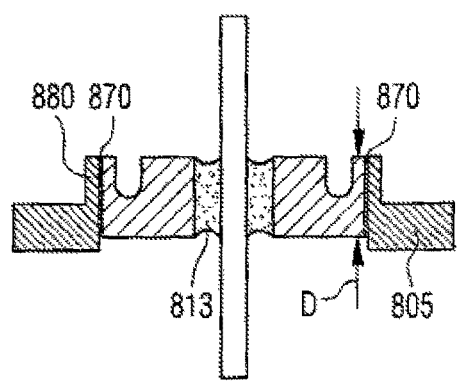

Shown FIGS. 5a-5b are variations of a feedthrough of a pin-shaped conductor through a base body whereby the feedthrough into the housing component, in particular the battery cover, is shown with a thermal barrier and a mechanical relief. Shown in FIGS. 5a and 5b is a first variation of an inventive feedthrough featuring a relief device for mechanical relief and shown as a thermal barrier.

Figure 8A:
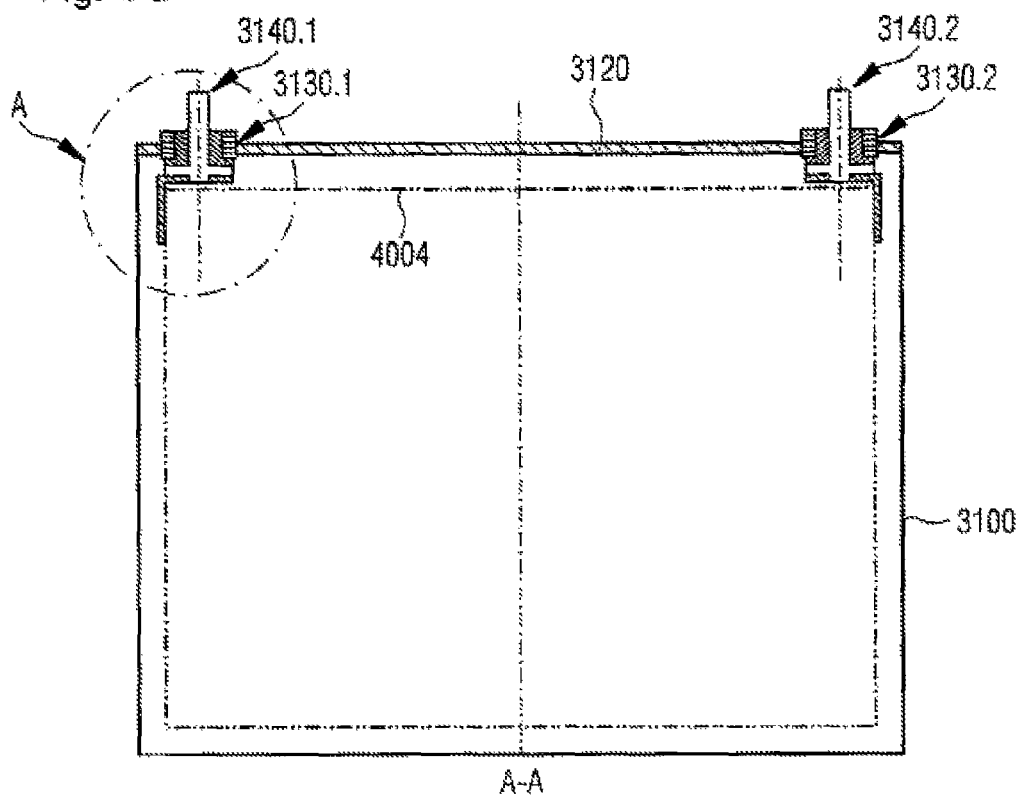
FIGS. 8a-8b illustrate a battery cell with a battery cell housing and a feedthrough according to the present invention with a feedthrough component with electrode connecting component in a two-part configuration of a second arrangement.
Figure 8B:
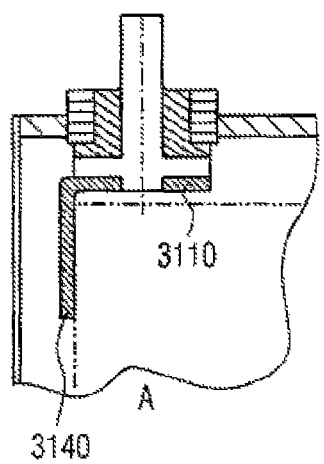

In contrast to the variations according to FIGS. 1a-4, base body 809 according to the variation shown in FIGS. 8a and 8b includes a circumferential groove 850 as the relief device. An essentially pin-shaped conductor 811 is again sealed with a glass or glass ceramic material 813 into base body 809 which features circumferential groove 850.

Further shown in FIG. 5a is also a housing part 805, essentially a cover for the battery cell. The feedthrough, consisting of base body 809 with essentially pin-shaped conductor, is circumferentially connected with housing part 805 in region 870, for example using welding, for example laser welding. Circumferential groove 850 on the one hand provides a thermal barrier, on the other it provides the necessary elasticity in order to protect or respectively de-stress the feedthrough, in particular in the region of seal 813. Circumferential groove 850 achieves in particular that occurring mechanical and thermal stresses upon the glass or respectively glass ceramic material are reduced. Crack formations in the glass or respectively glass-ceramic material of the feedthrough which could lead to leakage can herewith be considerably reduced.

The arrangement according to FIG. 5b again shows a feedthrough having circumferential groove 850 as a relief device in the base body. In contrast to the arrangement according to FIG. 5a, housing component 805 in this case is provided with protrusion 880 in the region of the connection between feedthrough and housing component 805. Compared to the arrangement according to FIG. 5a this leads to an even better mechanical relief. The base body can moreover be connected with housing part 805 over its entire thickness D, thereby permitting a precise welding process.

Figure 6A:
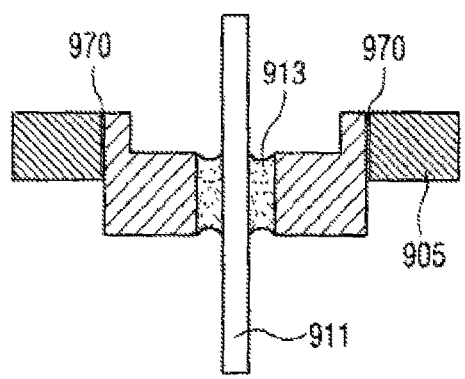
FIGS. 6a-6b are an example of a feedthrough according to the present invention with thermal barrier and mechanical relief.
Figure 6B:
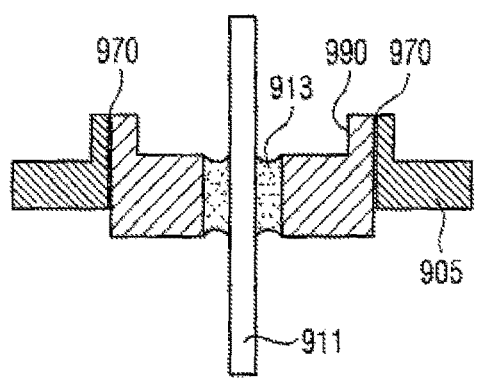

FIGS. 6a and 6b illustrate alternative variations to FIGS. 5a and 5b, whereby a relief device as well as a thermal barrier are also provided in FIGS. 6a and 6b. In contrast to the embodiment in accordance with FIG. 8a, the base body in this case is not equipped with a circumferential groove as a relief device, but instead with a protrusion 990. Identical components as in FIGS. 6a-6b are identified with reference numbers increased by 100 compared to FIGS. 5a and 5b. Accordingly, pin-shaped conductor is identified with reference 911, and glass and glass ceramic material with 913. The region of the connection between feedthrough and housing component is identified with 970. The advantages described above for FIG. 5a also apply to FIG. 6a and are herewith included.

FIG. 6b illustrates an alternative embodiment to that illustrated in FIG. 6a. In addition to the essentially ring-shaped base body 909, cover part 905 also has a protrusion 980. The advantages described above for FIG. 5b also apply to FIG. 6b and are herewith included.

FIGS. 7a-8b illustrate complete battery cells for a lithium-ion battery, with inserted feedthroughs, whereby an electrode-connecting component is connected with a conductor, meaning this is a two-component embodiment, wherein the substantially pin-shaped conductor must be connected with an electrode connecting component which, in a single component arrangement wherein the conductor represents at the same time the electrode connecting component according to the present invention, as shown in FIGS. 9a-11c, is avoided.

Figure 7A:
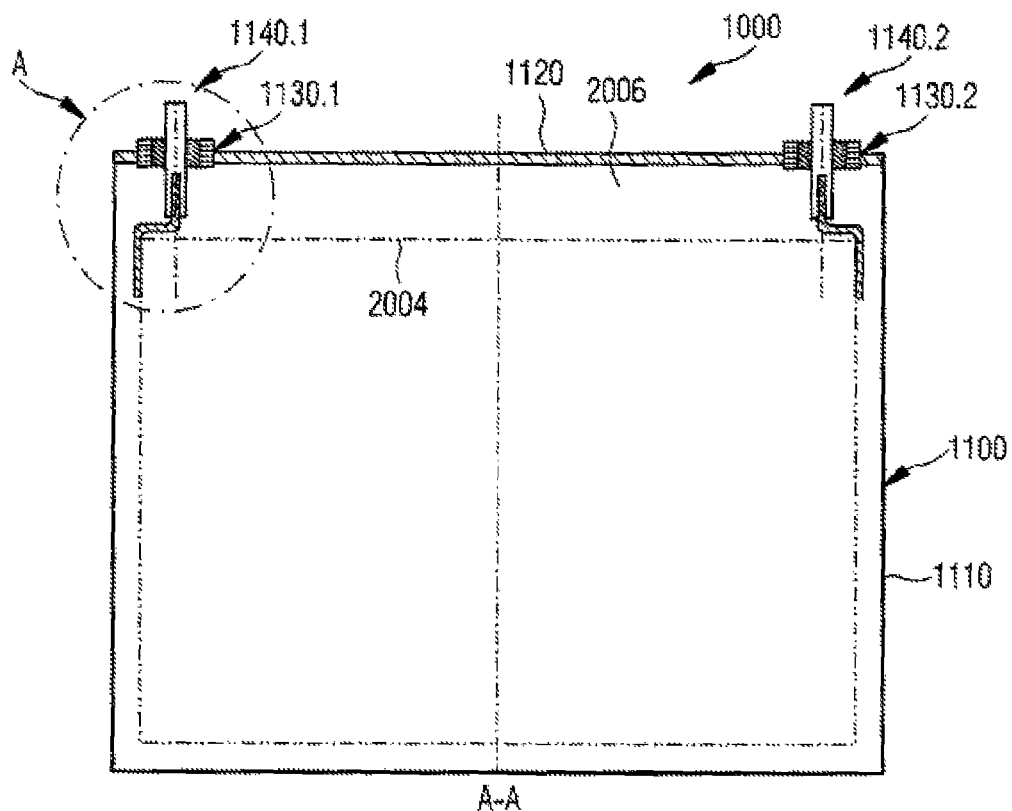
FIGS. 7a-7b illustrate a battery cell with a battery cell housing and a feedthrough according to the present invention with a feedthrough component with electrode connecting component in a two-part configuration of a first arrangement.
Figure 7B:
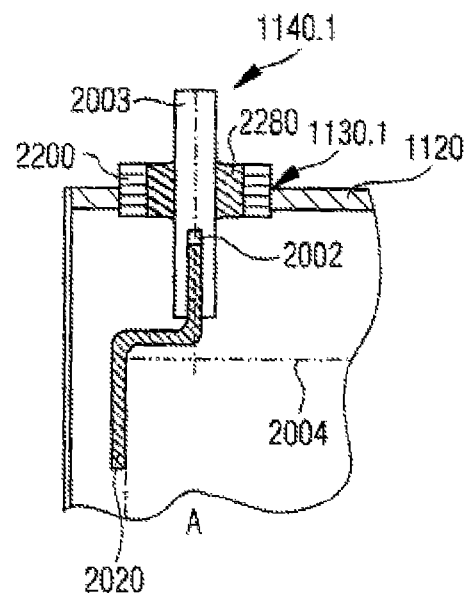

FIGS. 7a-7b show a battery cell whereby the conductor does not have a head part. FIGS. 8a to 8b illustrate a battery cell with a housing and feedthroughs installed therein, whereby the conductor does have a head part. The electrode connecting component is a separate component in both cases which must be connected with the conductor, in particular the substantially pin-shaped conductor, for example using welding. This is expensive and in particular requires space in the battery cell, as can be seen in FIGS. 7a to 7b. FIG. 7a illustrates the principle embodiment of a battery cell 1000. Battery cell 1000 includes a housing 1100 with side walls 1110 and a cover part 1120. Openings 1130.1, 1130.2 are produced in the opening of cover part 1120 of housing 1100, for example using stamping. Feedthroughs 1140, 1140.2 are again inserted in both openings 1130.1, 1130.2.

FIG. 7b shows a detailed section of battery cover 1120 with opening 1130.1 and the therein inserted feedthrough 1140.1. Feedthrough 1140.1 includes pin-shaped conductor 2003, as well as a base body 2200. Pin-shaped conductor 2003 without a head part is sealed with glass or glass ceramic material 2280 into base body 2200. After having been sealed into base body 2200 with glass or glass ceramic material 2280, pin-shaped conductor 2003 is inserted into opening 1130.1 as a complete component, for example in that base body 2200 of the feedthrough, which consists, for example, of aluminum is joined, for example, through welding with strain-hardened cover part 1120 consisting essentially of aluminum. Because of the sealing, only base body 2200 is softened.

A recess 2002 in which an electrode connecting part 2020 is inserted is provided on the pin-shaped conductor. The electrode connecting component serves again either as cathode or as anode of electrochemical cell 2004 of battery cell 1000. Housing 1100 surrounds battery cell 1000 in the embodiment of battery cell housing. Electrode connecting component and conductor are thereby two separate components which must be connected with one another.

As can be seen in FIG. 7a, based on the structure of feedthrough 1140.1, 1140.2 with a pin-shaped conductor and an electrode connecting component which is inserted in recess 2002 of the pin-shaped conductor and which is to be connected with electrochemical cell 2004, a large space 2006 is required which is created between electrochemical cell 2004 and cover 1120.

In order to minimize the non-utilized space in the battery cell housing, a two-component configuration according to FIGS. 8a-8b can be provided so that the conductor includes a head part with which the electrode connecting component is joined, for example through welding. Even though space can be gained by this type of arrangement, high manufacturing costs still remain due to the multi-component arrangement.

Identical components as in FIGS. 7a and 7b are identified with reference numbers increased by 2000. Feedthroughs 3140.1, 3140.2 are again inserted in openings 3130.1, 3130.2 of cover 3120 of battery cell housing 3100. In contrast to the feedthrough component of the feedthroughs according to FIGS. 7a and 7b, the feedthrough component is now provided with pin-shaped conductor 3003, as well as with a head part 3005. The head part is equipped with an extension 3030, as well as with an electrode connecting component 3010 which is firmly attached to head part 3005 using welding, soldering or other previously described method. The electrode connecting component has a segment 3140, whereby segment 3140 serves as cathode or respectively anode for electrochemical cell 4004. As can be seen from FIG. 8a to 8b the advantage of the inventive feedthrough component is clearly recognizable. The configuration of the feedthrough illustrated in FIGS. 8a through 8b determines that as little space as possible inside the battery cell housing remains unused.

Figure 9A:
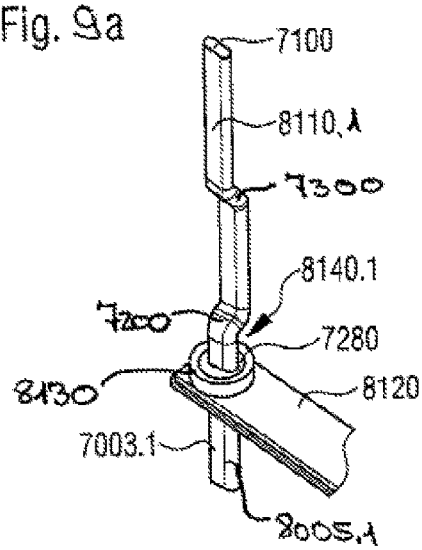
FIGS. 9a-9c illustrate a cover part for a battery cell housing for a battery cell with a feedthrough with feedthrough component according to the present invention in a one-part configuration of a first to third arrangement.
Figure 9B:
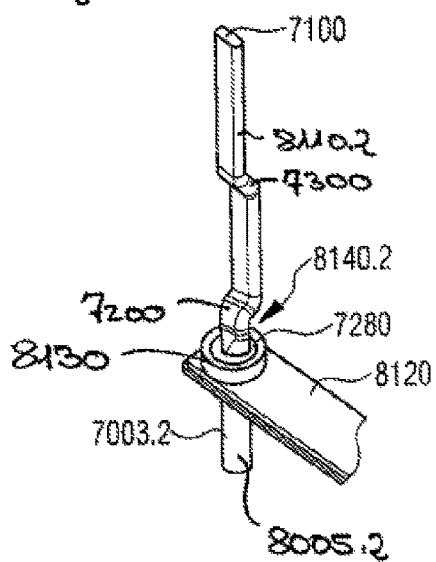
Figure 9C:
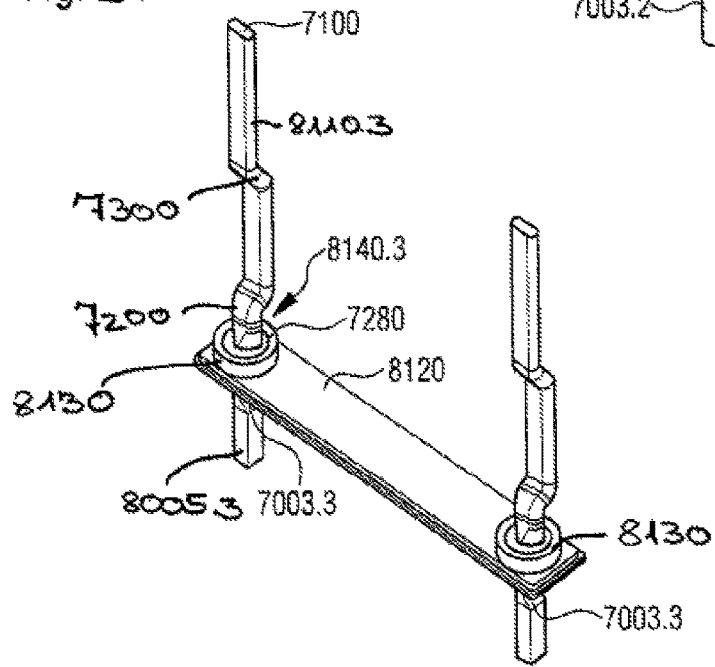

FIGS. 9a to 9c illustrate an inventive arrangement of a part of a battery housing with an inventive feedthrough. Identical components as in the aforementioned drawings are identified with reference numbers increased by 5000.

The embodiments illustrated in FIGS. 9a to 9c distinguish themselves in that the conductors, such as pin-shaped conductors 7003.1, 7003.2, 7003.3 at the end facing toward the battery cell, do not have a round shape, that is they do not have a round cross section as shown for example in FIGS. 7a-8b, but instead have an essentially rectangular cross section 7100. Rectangular cross section 7100 serves hereby as electrode connecting component which can be connected with the anode and/or cathode. In contrast to the arrangements according to FIGS. 7a to 8b it is not necessary to connect a separate electrode connecting component with the conductor, in particular the pin-shaped conductor which is guided through the feedthrough. Instead conductor 7003.1, 7003.2, 7003.3 is a single part component according to the present invention with first section 8005.1, 8005.2, 8005.3 in the region of feedthrough 8140.1, 8140.2, 8140.3 and seal 7280, as well as with second section 8110.1, 8110.2, 8110.3 which serves as an anode or cathode, or respectively can be connected with the anode or cathode of the electrochemical cell (not illustrated). Conductor 7003.1, 7003.2, 7003.3 moreover has two bent locations 7200, 7300. Conductor 7003.1, 7003.2, 7003.3 in principle already forms segment 8110.1, 8110.2, 8110.3 at its end which is facing toward the battery cell and which serves as a cathode, or respectively as an anode, for the electrochemical cell (not illustrated). In contrast to the embodiment according to FIGS. 8a and 8b where a separate electrode connecting component (identified with 3110 in FIG. 8b) is attached to the conductor, in particular the pin-shaped conductor, for example by welding, the electrode connecting component and the essentially pin-shaped conductor in the embodiments according to FIGS. 9a to 9c is a single-part component. This is advantageous from a manufacturing point of view since no two parts have to be connected with each other. Variations 7003.1, 7003.2, 7003.3 distinguish themselves essentially through the cross sectional shape of the conductor in the region of feedthrough 8140.1, 8140.2, 8140.3. In the arrangement according to FIG. 9a the cross section of the conductor in the region of sealing 7280 into glass or a glass material is also essentially rectangular.

In the arrangement according to FIG. 9b the cross section is round instead of the rectangular cross section in the region of seal 7280. This arrangement is advantageous, since due to the round cross section in the region of the feedthrough or respectively seal 7280, a simple reliable seal can be achieved with as low as possible manufacturing costs. This conductor with the round cross section is identified with reference number 7003.2. In the embodiment according to FIG. 9b the conductor features a round cross section facing the outside of the battery cell in contrast to the embodiment according to FIG. 9a.

In the arrangement according to FIG. 9c the cross section in the region of seal 7280 is also round like in FIG. 9b, however conductor 7003.3 is crimped in the region of connection to the outside of the battery housing and its cross section is therefore rectangular, for example square.

In all of FIGS. 9a through 9c, the covers of the battery housings are identified with 8120, the base body into which conductor 7003.1, 7003.2, 7003.3 is sealed is identified with 8130. A disadvantage of the single component arrangement according to FIGS. 9a to 9c is, that the conductors extend substantially straight into the battery cell interior. On the one hand this requires space, and on the other hand it is difficult to adjust the distances of the electrodes, or respectively to adapt to different battery cells with an unaltered battery cover with openings.

FIGS. 10a to 10e illustrate a fourth arrangement of a feedthrough for a battery cell in a single component configuration. As is the case in the arrangements according to FIGS. 8a to 9c the conductor at the end facing toward the battery cell does not have a round shape, in other words it does not have a round cross section, as shown for example in FIGS. 7a-8b, but instead has a substantially rectangular cross section so that the conductor at the end facing toward the battery cell already forms a section which can be connected with the cathode or anode. In this configuration, as already in the preceding FIGS. 8a to 9c, conductors 9003.1, 9003.2 and electrode connecting component 9110 are in the form of a single part component. Compared to the arrangements as shown in FIGS. 8a to 9c, and in particular compared to the arrangements according to FIGS. 9a to 9c, the arrangement according to FIGS. 10a to 10c offers the possibility to adjust the electrode distance and at the same time to maintain the location of the opening in the battery cell cover. Same components as in FIGS. 9a to 9c are identified with reference numbers which are increased by 1000, or respectively 2000.

Figure 10A:
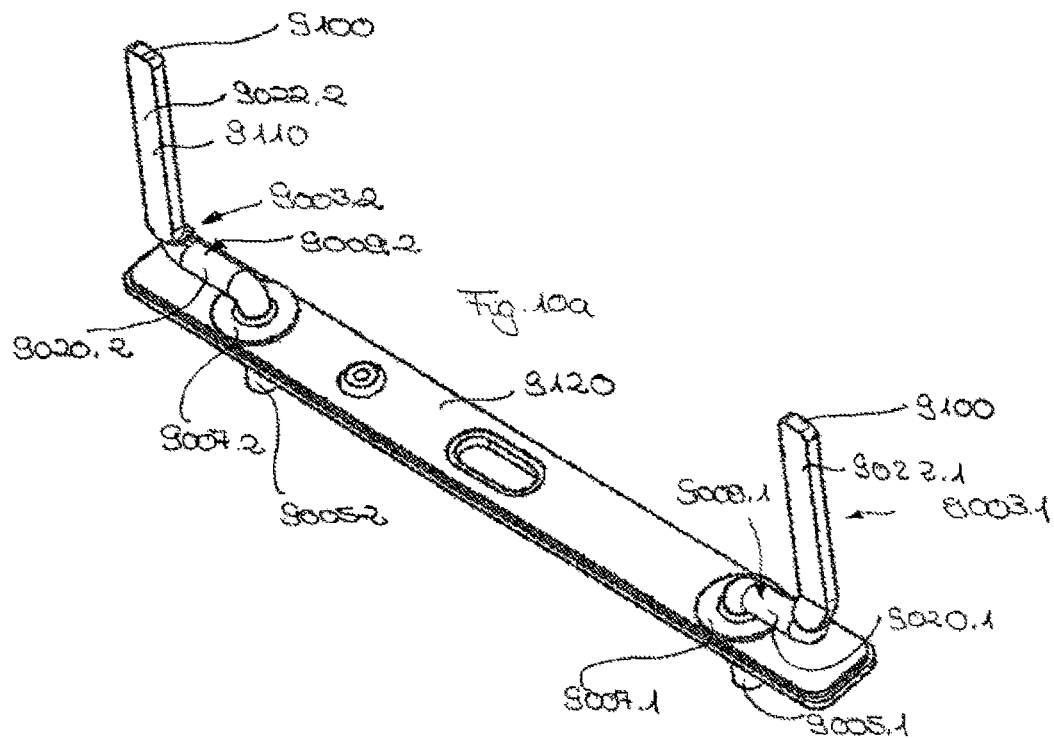
FIGS. 10a-10c illustrate a cover part for a battery cell housing for a battery cell with a feedthrough in a one-part configuration in a fourth arrangement, whereby the conductor is sealed in glass directly into the opening of the cover part.

FIG. 10a shows a three-dimensional view of cover 9120 for a battery housing with two inventive feedthroughs, Battery cover 9120 includes two openings 9007.1, 9007.2 through which a conductor 9003.1, 9003.2 according to the present invention is guided. Conductors 9003.1, 9003.2 have two sections, a first section 9005.1, 9005.2 which has a round, for example circular cross section, as well as a second section 9009.1, 9009.2, which has a substantially rectangular cross section 9100. Second section 9009.1, 9009.2 of the conductor having the substantially rectangular cross section originated through squeezing and can serve directly as a cathode or anode for the electrochemical cell (not illustrated) or can respectively be connected with the cathode or anode of the electrochemical cell, for example through welding. The surface of the substantially rectangular conductor cross section 9100 is, for example, consistent with the surface of the circular cross section of the conductor in first region 9005.1, so that conductive losses due to conductor cross sectional changes are securely avoided. In particular, impermissible heating of the battery cell is avoided.

The first section of conductor 9005.1, 9005.2 has a substantially circular cross section, in the region of the seal into a glass or glass ceramic material. In order to lose as little space as possible, the glazed seal is performed directly in openings 9007.1, 9007.2. If the material used for the housing or respectively the battery cover is aluminum or an aluminum alloy, then glass materials having an accordingly low sealing temperature—for example in the range of between approximately 250° C. and 650° C. are used.

In contrast to the embodiments according to FIGS. 9a to 9c, second section 9009.1, 9009.2 of the conductor has two regions, one region 9022.1, 9022.2 which can serve as anode and/or cathode of the of the electrochemical cell or can be connected with anode and/or cathode, as well as another region 9020.1, 9020.2 which progresses substantially horizontally and is perpendicular to first section 9005.1, 9005.2 and/or region 9022.1, 9022.2. Based on the selection of region 9020.1, 9020.2 and with constant opening of the battery cover the electrode distance can be easily adjusted. In the arrangement according to FIGS. 10a to 10e the cross section is circular like in the region of the feedthrough through the battery cover.

Figure 10B:
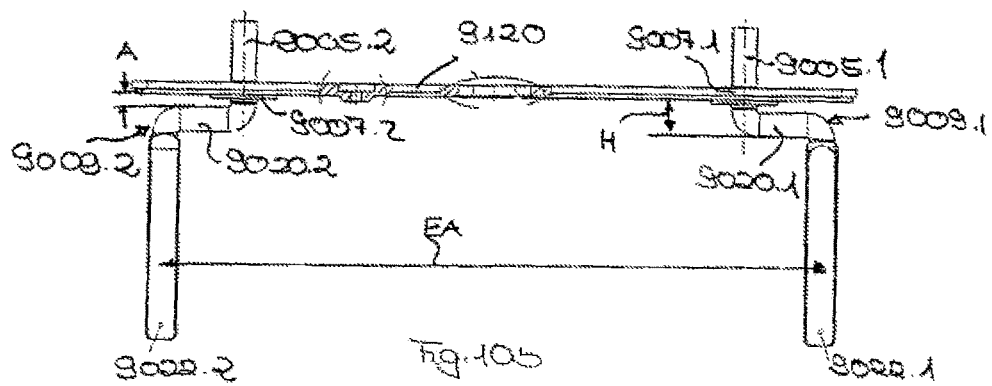

FIG. 10b illustrates a sectional view through a battery cover. Clearly visible is again conductor 9003.1, 9003.2 with its two sections—first section 9005.1, 9005.2 with a circular cross section in the region of the feedthrough through the glass or glass ceramic material and a second section 9009.1, 9009.2 with a rectangular section in the interior of the battery cell which can serve as a cathode or an anode and/or can be connected with a cathode or anode. For the connection with the battery cell terminals in the region of the second section, ultrasonic, resistance or laser welding may be used.

Also clearly visible is the additional region of the second section which has the same cross section as the first section that is circular. Due to the circular cross section a relatively large space is lost. The space loss can be expressed in height H in FIG. 10b which is, for example in the range of between approximately 5 mm and more than 8 mm. Distance A of the additional region which extends substantially horizontally from the battery cover is, for example 1 mm to 2 mm. In order to avoid short circuits provision can be made that additional region 9020.1, 9020.2 of the conductor includes insulating material.

Figure 10C:
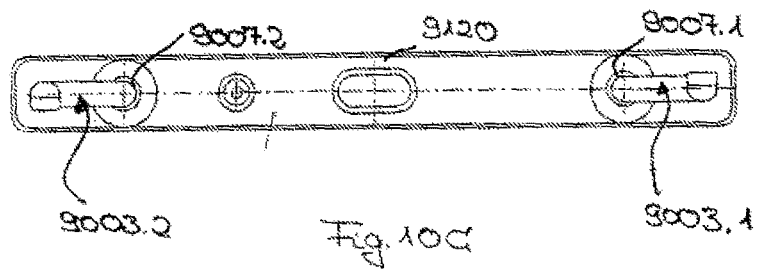

FIG. 10c shows a top view onto battery cover 9120. In the top view onto battery cover opening 9007.1, 9007.2 into which the first section 9005.1, 9005.2 of conductor 9003.1, 9003.2 with the substantially circular cross section is directly sealed is clearly visible. The glass and/or glass ceramic material is identified with 9200. A simple and reliable glass seal is achieved in the seal area due to the circular cross section.

Also clearly visible in the top view in FIG. 10c is rectangular conductor cross section 9100 in the region of the second section, as well as the additional perpendicular progressing region 9020.1, 9020.2 in the second section of the conductor.

The conductor is illustrated again in detail in FIGS. 10d and 10e. Here, FIG. 10d illustrates a front view of the conductor and FIG. 10e a sectional view along lines A-A in FIG. 10d. Clearly visible in FIGS. 10d and 10e are the first section with substantially circular cross section 9005.1, 9004.2 with diameter ID in the region of the feedthrough and the second section with the substantially rectangular cross section on the interior of the battery cell which is connectable with a cathode and/or anode. Second section 9009.1, 9005.2, due to squeezing that is reshaping, results from a conductor having a circular cross section, by maintaining the cross sectional surface. Since the conductor cross section does not change, heat losses can be avoided.

The difference between the first section with the circular cross section and the second section with the rectangular cross section can be clearly seen in FIG. 10e. The flat electrode shape in second section 9009.1 is clearly recognizable in FIG. 10e. The additional region in the second section which progresses substantially perpendicular to the first section is identified with 9020.1 and again displays a substantially circular cross section.

FIGS. 11a to 11e illustrate a further improved embodiment compared to the arrangement illustrated in FIGS. 10a to 10e. The arrangement according to FIGS. 11a to 11e is essentially consistent with the arrangements in FIGS. 10a to 10e, however, they distinguish themselves in that the adaptability of the electrodes to different battery cell configurations can be realized with concurrently low space loss.

Identical components as in FIGS. 10a to 10e are identified by reference numbers increased by 1000. The small area in second section 10009.1, 10009.2 in additional region 10020.1, 10020.2 in which the conductor extends substantially parallel to the battery cell housing or respectively perpendicular to first section 10005.1, 10005.2 is not arranged with a circular cross section as in the first arrangement according to FIGS. 10a to 10e, but includes a rectangular cross section which is substantially consistent with the rectangular section of the region of the second section which is connectible with a cathode or anode.

Like FIG. 10a, FIG. 11a shows a three-dimensional view of battery cover 10120 with conductors 10003.1, 10003.2 which, through openings in base body 10007.1, 10007.2, are guided through the battery cover. As is the case in the first arrangement according to FIG. 10a, first section 10005.1, 10005.2 of the conductor has a circular cross section which is sealed directly into openings 10007.1, 10007.2, embedded in a glass or glass ceramic material. Second section 10009.1, 10009.2 of the conductor has a rectangular cross section 10100. In contrast to FIGS. 10a to 10e the rectangular cross section extends over the entire second section 10009.1, 10009.2, in other words in region 10022.1, 10022.2 which is connectible with the anode and/or cathode, as well as in the additional region which extends substantially parallel to battery cover 10120 and which is identified with 10020.1, 10020.2.

As can be clearly seen in FIG. 11b in which the same reference numbers are used as in FIG. 11a, due to the arrangement of additional region 10020.1, 10020.2 with the rectangular cross section, height H which is lost through the conductor is considerably reduced. Compared to the embodiment shown in FIGS. 10a to 10c by approximately one third to a current height of H=3 mm to 5 mm, for example 4 mm. In order to avoid short circuits between the battery cover and the additional region of the conductor, provision may be made as in the arrangement in FIGS. 10a to 10c to provide insulating material.

In the arrangement according to FIGS. 10a to 10e, and in particular in the arrangement according to FIGS. 11a to 11e, the conductor can be produced in large numbers, for example from an extrusion material having a substantially circular cross section by simple reshaping, in other words through machining. The arrangement according to FIGS. 11a to 11e moreover permit a greatly space saving transition from a round cross section in the region of the feedthrough to a flat cross section in the region of the cathode or anode or the regions which are connectible with the cathode or anode.

The possibility to be able to freely select the length of additional region 10020.1, 10020.2 in the reshaping step allows for electrode distance EA to be adapted to the respective battery cell. The cathode or anode or respectively the connection of the second section of the conductor with the cathode or anode occurs with the assistance of welding, for example ultrasonic welding, resistance welding or laser welding.

FIG. 11c is a top view onto a battery cover according to FIG. 11a with installed conductors. Same components are again identified with the same reference numbers. The conductors are sealed directly into the openings of the battery cover.

FIGS. 11d and 11e show the conductor according to the present invention again in a detailed view. FIG. 11d shows a front view of the electrode and FIG. 11e the sectional view A-A according to FIG. 11d. As can be seen in FIG. 11d, first section 10005.1 with a circular cross section with diameter ID is transitioned into second section 10009.1 through reshaping or respectively machining. A continuously constant conductor cross section is hereby ensured. Due to the fact that the conductor cross section remains substantially constant over the entire conductor, no heat loss occurs over the entire conductive section. To avoid bending in particular of the additional region 10020.1, a stiffening embossing is provided on the flat electrode form. At a width B of, for example, 5 mm in the region of the flat electrode form an embossing approximately 1 mm to 2 mm wide and 0.5 mm deep occurs. Since bending is prevented by the stiffening embossing, a short circuit in the region of additional region 10020.1 toward the battery cell housing can be safely avoided. Region 10022.1 which can be connected with the cathode and/or respectively represents same has flexibility in its configuration in contrast to a round electrode shape. The angular electrode shape 10400 represents a flexibly formed connectivity zone which can be adapted to the respective position of the battery cell connections, thereby enabling easy connectivity of the battery cell connections with the electrode. The connective region is sufficiently large in spite of a variably selectable width B which can be adapted to the respective battery cell, as illustrated in FIG. 11d. Exemplary electrode materials, that is material for the conductor, are metals, such as copper or aluminum or alloys thereof.

The current invention cites for the first time a feedthrough for a housing, in particular a battery cell housing, for example for a lithium-ion battery which can be pre-manufactured and which is especially suited to be utilized in housing components of battery cell housings. The battery cell housing includes, for example a light metal such as aluminum (Al), an aluminum alloy, AlSiC, magnesium, a magnesium alloy, titanium or a titanium alloy. However, metals such as steel or high-grade steel, such as stainless steel or tool steel are possible as materials for the battery cell housing. In such a case the materials of the base body and/or the essentially pin-shaped conductor are adapted.

The inventive solution further allows reverting to a cost-effective manufacturing process and basic materials. In a first embodiment the entire feedthrough can be in the embodiment of a pre-manufactured component into which the metal pin is sealed into a base body by a bonding material that is, for example, a glass plug, before the base body is placed into the housing component. This ensures that there is no loss of strain-hardening in the housing component. Moreover, material thicknesses and materials for the housing component and the base body can be selected independently. The feedthrough can be mechanically as well as thermally relieved through a special arrangement with a relief device.

An alternative hereto is direct sealing which saves space. In direct sealing the glass material must have a sealing temperature which is adapted to the housing material, whereby the housing material is selected so that it has sufficient strength.

With the present invention, the electrode distances can be very easily adapted to different battery cells. Moreover, due to the constant conductive cross section in the region of the feedthrough and the electrode connecting region the conductive loss is minimized and thereby also the heat loss. Because of the round cross section in the region of the seal, a reliable seal is provided.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feedthrough through a housing component of a housing, the feedthrough comprising:
a material which is a glass material or a ceramic material; and
at least one conductor embedded in said material and guided through an opening in the housing component, said at least one conductor having a cross section and at least two sections including a first section having a first substantially round cross section with a diameter (ID) in a region of the feedthrough through said material and a second section having a second substantially non-round cross section, said at least one conductor being a one-part component, said first substantially round cross section having a first cross-sectional area which is substantially the same as a second cross-sectional area of said second substantially non-round cross section.

2. The feedthrough according to claim 1, wherein the housing is a battery housing.

3. The feedthrough according to claim 1, wherein the housing consists essentially of a metal.

4. The feedthrough according to claim 3, wherein said metal is a light metal.

5. The feedthrough according to claim 4, said light metal being one of aluminum, an aluminum alloy, AlSiC, magnesium, a magnesium alloy, titanium, a titanium alloy, steel, stainless steel and a high-grade steel.

6. The feedthrough according to claim 1, wherein said first substantially round cross section is a circular cross section.

7. The feedthrough according to claim 1, wherein said second substantially non-round cross section is a substantially rectangular cross section.

8. The feedthrough according to claim 1, said second section having at least two bends.

9. The feedthrough according to claim 1, said second section having a region which is connectable with at least one of an anode and a cathode.

10. The feedthrough according to claim 9, said second section having an additional region extending substantially horizontal, said additional region being located perpendicular to at least one of said first section and said region which is connectable with at least one of an anode and a cathode.

11. The feedthrough according to claim 10, said second section including a stiffening.

12. The feedthrough according to claim 11, said stiffening being a U-profile.

13. The feedthrough according to claim 12, said stiffening being in said additional region of said second section.

14. The feedthrough according to claim 10, wherein said at least one conductor is a pin-shaped conductor embedded in said glass material or said glass ceramic material, said pin-shaped conductor being inserted in a region of said opening of the housing component.

15. The feedthrough according to claim 14, further comprising a base body accommodated by said opening of the housing component of the housing, said material which is a glass material or a glass ceramic material is introduced between said base body and said at least one conductor.

16. The feedthrough according to claim 15, said material which is a glass material or a glass ceramic material has a sealing temperature which is lower than a melting temperature of at least one of said base body, said conductor, and a material of the housing.

17. The feedthrough according to claim 15, the housing component has an outside and an inside and said base body is connected with at least one of said inside of the housing component and said outside of the housing component.

18. The feedthrough according to claim 17, wherein said base body is connected with at least one of said inside of the housing component and said outside of the housing component through one of a welding connection, a soldering connection and pressing.

19. The feedthrough according to claim 18, wherein the housing component is a cover of the housing.

20. The feedthrough according to claim 19, wherein the housing component is a cover of a battery housing having an inside and an outside, said additional region of said second section extending substantially horizontal and parallel to said inside of said battery housing and having a surface defining a maximum distance to said inside of said battery housing, said maximum distance of said surface to said inside of said battery housing being in a range between approximately 0.7·ID to 1.5·ID or in a range of 3 millimeters (mm) to 5 mm.

21. The feedthrough according to claim 20, wherein said additional region of said second section extends substantially horizontal and parallel to said cover of said battery housing and said maximum distance to said inside of said battery housing is in a range between approximately 3.5 mm to 4.5 mm.

22. The feedthrough according to claim 21, further comprising an insulating material arranged between said inside of the housing component and a second surface of said second section opposite said surface defining said maximum distance to said inside of said battery housing.

23. The feedthrough according to claim 22, wherein said insulating material is a plastic insulating material.

24. The feedthrough according to claim 1, said at least one conductor being formed from a material which is a metal.

25. The feedthrough according to claim 24, said metal of said at least one conductor being one of copper, CuSiC, a copper alloy, aluminum, AlSiC, an aluminum alloy, magnesium, a magnesium alloy, NiFe, a NiFe jacket with an interior copper part, silver, a silver alloy, gold, a gold alloy, and a cobalt-iron alloy.

26. The feedthrough according to claim 1, said material which is a glass material or a glass ceramic material including in mole percent (mol-%):

| | |
|---|---|
| $P_2O_5$ | 35-50 mol-%; |
| $Al_2O_3$ | 0-14 mol-%; |
| $B_2O_3$ | 2-10 mol-%; |
| $Na_2O$ | 0-30 mol-%; |
| $M_2O$ | 0-30 mol-%, wherein M is one of K, Cs and Rb; |
| PbO | 0-10 mol-%; |
| $Li_2O$ | 0-45 mol-%; |
| BaO | 0-20 mol-%; and |
| $Bi_2O_3$ | 0-10 mol-%. |

27. The feedthrough according to claim 26, said material which is a glass material or a glass ceramic material including in mol-%:

| | |
|---|---|
| $P_2O_5$ | 39-48 mol-%; |
| $Al_2O_3$ | 2-12 mol-%; |
| $B_2O_3$ | 4-8 mol-%; |
| $Na_2O$ | 0-20 mol-%; |
| $M_2O$ | 12-20 mol-%; |
| PbO | 0-9 mol-%; |
| $Li_2O$ | 0-40 mol-%; |
| BaO | 5-20 mol-%; and |
| $Bi_2O_3$ | 1-5 mol-%. |

28. The feedthrough according to claim 27, said material which is a glass material or a glass ceramic material including in mol-%:

| | |
|---|---|
| PbO | 0 mol-%; |
| Li$_2$O | 17-40 mol-%; and |
| Bi$_2$O$_3$ | 2-5 mol-%. |

29. The feedthrough according to claim 26, said material which is a glass material or a glass ceramic material including in mol-%:

| | |
|---|---|
| P$_2$O$_5$ | 38-50 mol-%; |
| Al$_2$O$_3$ | 3-14 mol-%; |
| B$_2$O$_3$ | 4-10 mol-%; |
| Na$_2$O | 10-30 mol-%; |
| K$_2$O | 10-20 mol-%; and |
| PbO | 0-10 mol-%. |

30. The feedthrough according to claim 29, said material which is a glass material or a glass ceramic material including in mol-%:

| | |
|---|---|
| P$_2$O$_5$ | 39-48 mol-%; |
| Al$_2$O$_3$ | 4-12 mol-%; |
| B$_2$O$_3$ | 4-8 mol-%; |
| Na$_2$O | 14-20 mol-%; |
| K$_2$O | 12-19 mol-%; and |
| PbO | 0-9 mol-%. |

31. The feedthrough according to claim 30, said material which is a glass material or a glass ceramic material including 0 mol-% PbO.

32. A housing, comprising:
a housing component having an opening; and
at least one feedthrough including:
a material which is a glass material or a ceramic material; and
at least one conductor embedded in said material and guided through said opening in said housing component, said at least one conductor having a cross section and at least two sections including a first section having a first substantially round cross section with a diameter (ID) in a region of the feedthrough through said material and a second section having a second substantially non-round cross section, said at least one conductor being a one-part component, said first substantially round cross section having a first cross-sectional area which is substantially the same as a second cross-sectional area of said second substantially non-round cross section.

33. The housing according to claim 32, wherein the housing is for a battery cell.

34. An accumulator, comprising:
a feedthrough including:
a material which is a glass material or a ceramic material; and
at least one conductor embedded in said material, said at least one conductor having a cross section and at least two sections including a first section having a first substantially round cross section with a diameter (ID) in a region of the feedthrough through said material and a second section having a second substantially non-round cross section, said at least one conductor being a one-part component, said material which is a glass material or a glass ceramic material including in mol-%:

| | |
|---|---|
| P$_2$O$_5$ | 39-48 mol-%; |
| Al$_2$O$_3$ | 2-12 mol-%; |
| B$_2$O$_3$ | 4-8 mol-%; |
| Na$_2$O | 0-20 mol-%; |
| M$_2$O | 12-20 mol-%; |
| PbO | 0-9 mol-%; |
| Li$_2$O | 0-40 mol-%; |
| BaO | 5-20 mol-%; and |
| Bi$_2$O$_3$ | 1-5 mol-%. |

35. The accumulator according to claim 34, wherein said accumulator is a battery.

36. The accumulator according to claim 35, said battery being a lithium-ion battery.

37. The accumulator according to claim 35, said battery having a battery housing.

38. The accumulator according to claim 37, the battery housing including a housing component having an opening, said at least one conductor embedded in said material which is a glass material or a glass ceramic material being guided through said opening.

39. The accumulator according to claim 34, the accumulator being a lithium-ion accumulator.

40. A feedthrough through a housing component of a housing, the feedthrough comprising:
a material which is a glass material or a ceramic material;
a base body; and
at least one conductor embedded in said material and guided through said base body;
an opening in the housing component receiving said base body with said conductor, said at least one conductor having a cross section and at least two sections including a first section having a first substantially round cross section with a diameter (ID) in a region of the feedthrough through said material and a second section having a second substantially non-round cross section, said at least one conductor being a one-part component, said first substantially round cross section having a first cross-sectional area which is substantially the same as a second-cross-sectional area of said second substantially non-round cross section.

41. The feedthrough according to claim 40, wherein a thickness of a housing material of said housing is smaller than a thickness of said base body.

42. The feedthrough according to claim 40, wherein a thickness of a housing material of said housing is less than or equal to 1.5 mm.

43. The feedthrough according to claim 40, wherein a thickness of said base body is at least 2.0 mm.

44. A housing, comprising:
a housing component having a housing opening;
a base body placed in said housing opening and having a body opening; and
at least one feedthrough including:
a material which is a glass material or a ceramic material; and
at least one conductor embedded in said material and guided through said body opening in said base body, said at least one conductor having a cross section and at least two sections including a first section having a first substantially round cross section with a diameter (ID) in a region of the feedthrough through said material and a second section having a second substantially non-round cross section, said at least one conductor being a one-part component, said first substantially round cross section having a first cross-sectional area which is substantially the same as a second-cross-sectional area of said second substantially non-round cross section.

45. The housing according to claim 44, wherein said housing includes a housing material with a thickness which is less than a thickness of said base body.

46. The housing according to claim 45, wherein said thickness of said housing material is less than or equal to 1.5 mm.

47. The housing according to claim 45, wherein said thickness of said base body is at least 2.0 mm.

* * * * *